US010840730B2

(12) United States Patent
Lim et al.

(10) Patent No.: US 10,840,730 B2
(45) Date of Patent: Nov. 17, 2020

(54) ELECTRONIC DEVICE AND METHOD FOR CONTROLLING POWER SUPPLY

(71) Applicant: Samsung Electronics Co., Ltd, Suwon-si (KR)

(72) Inventors: Kyung-Woo Lim, Suwon-si (KR); Byeong-Hyun Jang, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 16/177,967

(22) Filed: Nov. 1, 2018

(65) Prior Publication Data

US 2019/0131810 A1 May 2, 2019

(30) Foreign Application Priority Data

Nov. 1, 2017 (KR) .......................... 10-2017-0144894

(51) Int. Cl.
*H02J 7/00* (2006.01)
*H02J 7/34* (2006.01)

(52) U.S. Cl.
CPC ............ *H02J 7/342* (2020.01); *H02J 7/0029* (2013.01); *H02J 7/00* (2013.01); *H02J 7/00034* (2020.01); *H02J 7/00045* (2020.01)

(58) Field of Classification Search
CPC .. H02J 7/00; H02J 7/0068; H02J 7/342; H02J 1/102; H02J 7/0029; H02J 7/00034; H02J 7/00045
USPC ........................................ 320/103, 114, 128
See application file for complete search history.

(56) References Cited

U.S. PATENT DOCUMENTS

| 9,973,017 | B2 | 5/2018 | Kudo et al. | |
| 2011/0298426 | A1* | 12/2011 | Hussain | H02J 7/0068 |
| | | | | 320/128 |
| 2016/0056651 | A1* | 2/2016 | Von Novak, III | H02J 7/00 |
| | | | | 320/114 |
| 2017/0054328 | A1* | 2/2017 | Jung | H04B 5/0037 |
| 2019/0036332 | A1* | 1/2019 | Kobayashi | H02J 1/102 |

FOREIGN PATENT DOCUMENTS

KR 10-2016-0034790 A 3/2016

* cited by examiner

*Primary Examiner* — Paul Dinh

(57) ABSTRACT

An electronic device includes: a connection terminal, a battery, a power regulator configured to supply power regulated using power supplied from the battery to an external electronic device connected through the connection terminal, a switch configured to open or connect a path between the battery and the external electronic device connected through the connection terminal, and a control circuit configured to detect a connection with the external electronic device through the connection terminal, acquire identification information from the external electronic device, when the identification information meets a first predetermined condition, provide power regulated using the power regulator to the external electronic device through the connection terminal in a state in which the switch is open, and when the identification information meets a second predetermined condition, provide power supplied from the battery to the external electronic device through the connection terminal in a state in which the switch is connected.

21 Claims, 15 Drawing Sheets

ELECTRONIC DEVICE AND METHOD FOR CONTROLLING POWER SUPPLY

CROSS-REFERENCE TO RELATED APPLICATIONS

This application is based on and claims priority under 35 U.S.C. § 119 to Korean Patent Application No. 10-2017-0144894 filed on Nov. 1, 2017, in the Korean Intellectual Property Office, the disclosure of which is incorporated by reference herein in its entirety.

BACKGROUND

1. Field

The present disclosure relates to an electronic device and a method for controlling power supply.

2. Description of Related Art

Recently, various services and additional functions provided by electronic devices have been gradually expanded. In order to increase the practical value of electronic devices and meet various demands of users, communication service providers or electronic device manufacturers provide a greater variety of functions and competitively develop electronic devices so as to differentiate the same from those of other companies.

The electronic device may perform various functions which can be executed in the electronic device by receiving power from a battery included therein. Alternatively, the electronic device may be connected to a battery device (for example, a battery pack) through an external power source (for example, a power plug) or a USB cable and receive power from the battery device through a wire. Alternately, the electronic device may wirelessly receive power through a wireless charger which can wirelessly provide power. The electronic device may charge the battery included in the electronic device by receiving power from another external power source (for example, an electric outlet, a battery pack, or a wireless charger) other than the battery included therein.

SUMMARY

For example, when an external battery device (for example, a battery pack) is connected to an electronic device through a Universal Serial Bus (USB) connector and the battery device supplies power to the electronic device, the battery device may boost or reduce the voltage of the battery device to the voltage which can be charged in the electronic device and provide the boosted or reduced voltage to the electronic device.

When the battery device boosts or reduces the voltage of the battery included in the battery device to the voltage which can be charged in the electronic device to the electronic device, transmitted power may be limited and power consumption may be generated. Further, during a process in which the battery device boosts or reduces the voltage of the battery included in the battery device, heat or noise may be generated in the battery device.

Various embodiments may provide an electronic device and a method for controlling power supply of a battery device.

According to various embodiments, it is possible to provide a voltage of power (for example, a battery) included in the battery device to the electronic device without passing through a circuit for boosting or reducing the voltage.

According to various embodiments, it is possible to provide power of the battery device to the electronic device without passing through the circuit for boosting or reducing the voltage of power included in the battery device by performing authentication between the battery device and the electronic device, and the electronic device may charge the battery included in the electronic device based on the power received from the battery device.

According to various embodiments, the battery device may provide power of the battery to the electronic device without passing through the circuit for boosting or reducing the voltage of the power included in the battery device by transmitting/receiving identification information through USB type-C or USB communication in authentication between the battery device and the electronic device.

In accordance with an aspect of the present disclosure, an electronic device is provided. The electronic device includes: a connection terminal; a battery; a power regulator configured to supply power regulated using power supplied from the battery to an external electronic device connected through the connection terminal; a switch configured to open or connect a path between the battery and the external electronic device connected through the connection terminal; and a control circuit, wherein the control circuit is configured to detect a connection with the external electronic device through the connection terminal, acquire identification information from the external electronic device, provide power regulated using the power regulator to the external electronic device through the connection terminal in a state in which the switch is open when the identification information meets a first predetermined condition, and provide power supplied from the battery to the external electronic device through the connection terminal in a state in which the switch is connected when the identification information meets a second predetermined condition.

In accordance with another aspect of the present disclosure, an electronic device is provided. The electronic device includes: a connection terminal; a battery; a charging circuit; and a processor, wherein the processor is configured to detect a connection with an external electronic device through the connection terminal, transmit identification information to the external electronic device in order to allow the external electronic device to output one of first power which can be output from a battery of the external electronic device and second power regulated through a power regulator included in the external electronic device based on the first power, and charge the battery with the one power through the charging circuit.

In accordance with another aspect of the present disclosure, an electronic device is provided. The electronic device includes: a connection terminal for connecting to an external electronic device; a battery; a charging circuit; and a processor, wherein the processor is configured to detect the connection with the external electronic device through the connection terminal, acquire identification information from the external electronic device, charge the battery through the charging circuit using power output from the external electronic device when the identification information meets a first predetermined condition, and charge the battery through the charging circuit using one of first power which can be output from a battery of the external electronic device and second power regulated through a power regulator included in the external electronic device based on the first power when the identification information meets a second predetermined condition.

According to various embodiments, it is possible to reduce heat or noise generated by the battery device by providing power of the battery device to the electronic device without passing through the circuit for boosting or reducing the voltage of power of the battery device.

According to various embodiments, it is possible to increase efficiency of the battery device by performing authentication between the battery device and the electronic device and providing power of the battery device to the electronic device without passing through the circuit for boosting or reducing the voltage of power of the battery device.

According to various embodiments, it is possible to perform authentication between the battery device and the electronic device by transmitting/receiving identification information through USB type-C or USB communication between the battery device and the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
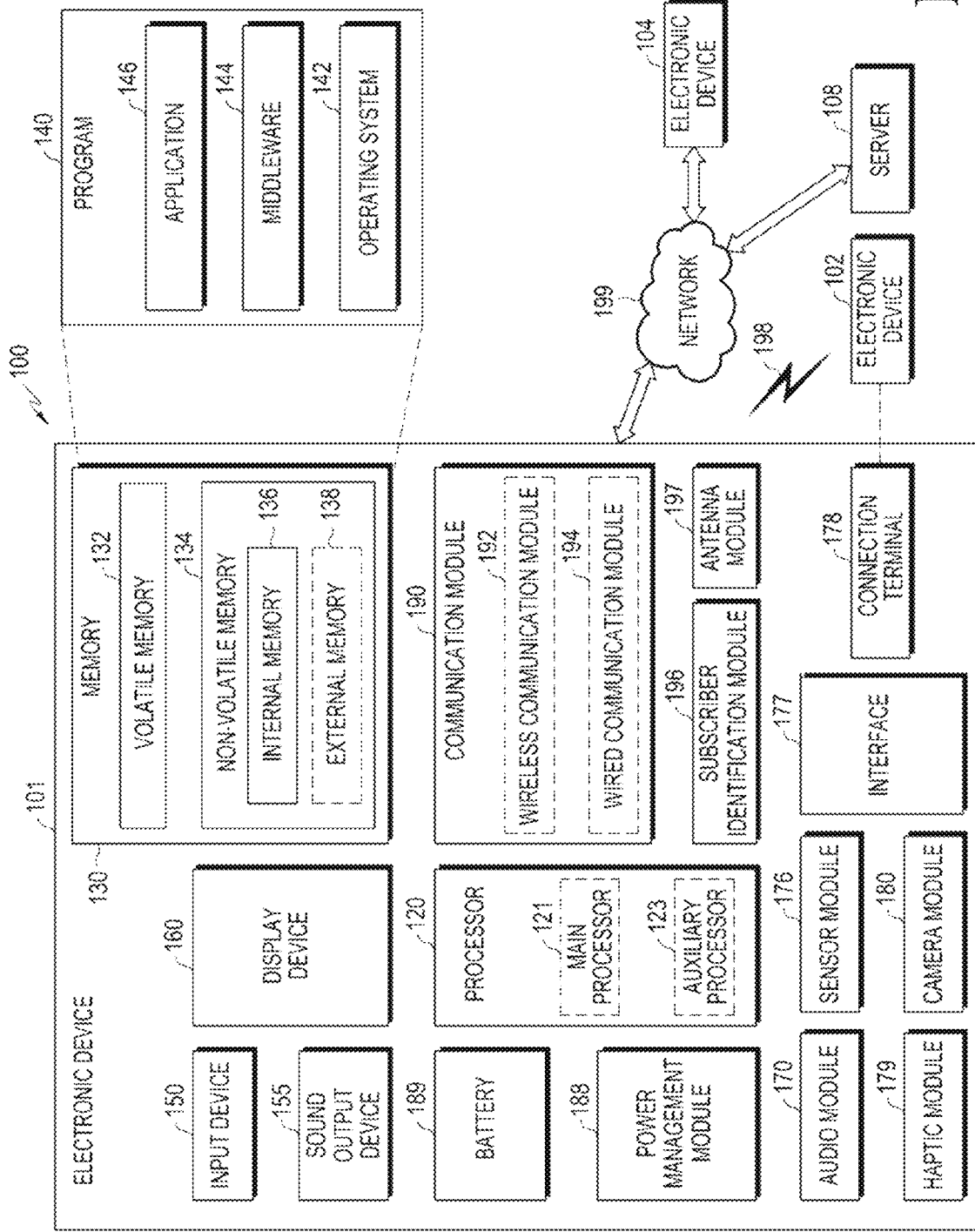
FIG. 1 is a block diagram illustrating an electronic device within a network environment for controlling power supply according to various embodiments.

FIG. 1 is a block diagram of an electronic device 101 within a network environment 100 to control power supply according to various embodiments.

Referring to FIG. 1, the electronic device 101 may communicate with an external electronic device 102 through a first network 198 (for example, short-range wireless communication) or communicate with an external electronic device 104 or a server 108 through a second network 199 (for example, long-distance wireless communication) in the network environment 100. According to an embodiment, the electronic device 101 may communicate with the external electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, at least one of the elements (for example, the display device 160 or the camera module 180) may be omitted or other elements may be added to the electronic device 101. In some embodiments, some elements may be integrated like in the case in which, for example, the sensor module 176 (for example, a fingerprint sensor, an iris sensor, or an illumination sensor) embedded into the display device 160.

The processor 120 may control, for example, at least one other element (for example, a hardware or a software element) of the electronic device 101 connected to the processor 120 by driving software (for example, the program 140) and may perform various data processing and calculations. The processor 120 may load instructions or data received from other elements (for example, the sensor module 176 or the communication module 190) into volatile memory 132 and process the loaded instructions or data, and may store resultant data in non-volatile memory 134. According to an embodiment, the processor 120 may include a main processor 121 (for example, a central processing unit or an application processor) and an auxiliary processor 123 (for example, a graphic processing unit, an image signal processor, a sensor hub processor, or a communication processor) operating independently from the main processor 121 and additionally or substantially using lower power than the main processor 121 or specified for a predetermined function. The auxiliary processor 123 may operate separately from the main processor 121 or in the state of being embedded in the main processor 121.

In this case, the auxiliary processor 123 may control at least part of functions or states related to at least one of the elements of the electronic device 101 (for example, the display device 160, the sensor module 176, or the communication module 190) instead of a main processor 121 while the main processor 121 is in an inactive (for example, sleep) state or together with the main processor 121 while the main processor 121 is in an active state (for example, a state in which an application is executed). According to an embodiment, the auxiliary processor 123 (for example, an image signal processor or a communication processor) may be implemented as partial elements of other functionally relevant elements (for example, the camera module 180 or the communication module 190). The memory 130 may store various data used by at least one element of the electronic device 101 (for example, the processor 120 or the sensor module 176), for example, software (for example, the program 140) and input data or output data for instruction related thereto. The memory 130 may include volatile memory 132 or non-volatile memory 134.

The program 140 is software stored in the memory 130, and may include, for example, an operating system 142, middleware 144, or an application 146.

The input device 150 is a device for receiving instructions or data to be used for an element of the electronic device 101 (for example, the processor 120) from the outside of the electronic device 101 (for example, from a user) and may include, for example, a microphone, a mouse, or a keyboard.

The sound output device 155 is a device for outputting a sound signal to the outside of the electronic device 101, and may include, for example, a speaker used for general purposes, such as multimedia reproduction or recordings, and a receiver dedicated to receiving calls. According to an embodiment, the receiver and the speaker may be formed in an integrated manner or a separated manner.

The display device 160 is a device for providing visual information to the user of the electronic device 101, and may include, for example, a display, a hologram device, or a control circuit for controlling a projector and a corresponding device. According to an embodiment, the display device 160 may include a touch circuitry or a pressure sensor for measuring a strength of pressure of a touch.

The audio module 170 may bilaterally convert sound and an electric signal. According to an embodiment, the audio module 170 may acquire a sound through the input device 150 or output a sound through the sound output device 155 or an external electronic device connected to the electronic device 101 through a wire or wirelessly (for example, the electronic device 102 (for example, a speaker or headphones).

The sensor module 176 may generate an electric signal or a data value corresponding to an internal operation state (for example, power or temperature) or an external environment state of the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an Infrared (IR) sensor, a biometric sensor, a temperature sensor, a humidity sensor, or an illumination sensor.

The interface 177 may support a predetermined protocol which can enable connection to an external electronic device (for example, the electronic device 102) wirelessly or through a wire. According to an embodiment, the interface 177 may include a High-Definition Multimedia Interface (HDMI), a Universal Serial Bus (USB) interface, an SD card interface, or an audio interface.

A connection terminal 178 may include a connector, which can physically connect the electronic device 101 and an external electronic device (for example, the electronic device 102), for example, an HDMI connector, a USB connector, an SD card connector, or an audio connector (for example, a headphone connector).

The haptic module 179 may convert an electric signal into mechanical stimulation (for example, vibration or motion) or electric stimulation, which the user recognizes through a sense of touch or kinesthesia. The haptic module 179 may include, for example, a motor, a piezoelectric element, or an electro-stimulator.

The camera module 180 may photograph a still image and a dynamic image. According to an embodiment, the camera module 180 may include one or more lenses, an image sensor, an image signal processor, or a flash.

The power management module 188 is a module for managing power supplied to the electronic device 101, and may be configured as at least part of a Power Management Integrated Circuit (PMIC).

The battery 189 is a device for supplying power to at least one element of the electronic device 101 and may include, for example, a primary cell, which is not rechargeable, a secondary cell, which is rechargeable, or a fuel cell.

The communication module 190 may support establishment of a wired or wireless communication channel between the electronic device 101 and an external electronic device (for example, the electronic device 102, the external electronic device 104, or the server 108) or communication through the established communication channel. The communication module 190 may include one or more communication processors for supporting wired communication or wireless communication, operating independently from the processor 120 (for example, an application processor). According to an embodiment, the communication module 190 may include a wireless communication module 192 (for example, a cellular communication module, a short-range wireless communication module, or a Global Navigation Satellite System (GNSS) communication module) or a wired communication module 194 (for example, a Local Area Network (LAN) communication module or a power-line communication module), and may communicate with an external electronic device through a first network 198 (for example, a short-range communication network such as Bluetooth, Wi-Fi direct, or Infrared Data Association (IrDA)) or a second network 199 (for example, a long-distance communication network such as a cellular network, Internet, or a computer network (for example, a LAN or a WAN)) using one of the communication modules. The various types of communication modules 190 may be implemented by a single chip or separate chips.

According to an embodiment, the wireless communication module 192 may identify and authenticate the electronic device 101 within a communication network based on user information stored in the subscriber identification module 196.

The antenna module 197 may include one or more antennas for transmitting a signal or power to the outside or receiving a signal or power from the outside. According to an embodiment, the communication module 190 (for example, the wireless communication module 192) may transmit a signal to an external electronic device or receive a signal from an external electronic device through an antenna suitable for a communication scheme.

Some of the elements may be connected to each other through a communication scheme between peripheral devices (for example, a bus, General Purpose Input/Output (GPIO), a Serial Peripheral Interface (SPI), or a Mobile Industry Processor Interface (MIPI)) and exchange signals (for example, instructions of data) therebetween.

According to an embodiment, instructions or data may be transmitted or received between the electronic device 101 and the external electronic device 104 through the server 108 connected to a second network 199. Each of the electronic devices 102 and 104 may be a device which is the same type as or a different type from that of the electronic device 101. According to an embodiment, all or some of the operations executed in the electronic device 101 may be executed by one or a plurality of external electronic devices. According to an embodiment, when the electronic device 101 is used to perform some functions or services automatically or by a request, the electronic device 101 may make a request for at least some functions related thereto to an external electronic device instead of executing the functions or services by itself or additionally make the request. The external electronic device receiving the request may execute a requested function or an additional function and transmit the result thereof to the electronic device 101. The electronic device 101 may provide the received result as it is or additionally process the received result and provide the requested functions or services. To achieve this, for example, cloud computing, distributed computing, or client-server computing technology may be used.

Figure 2:
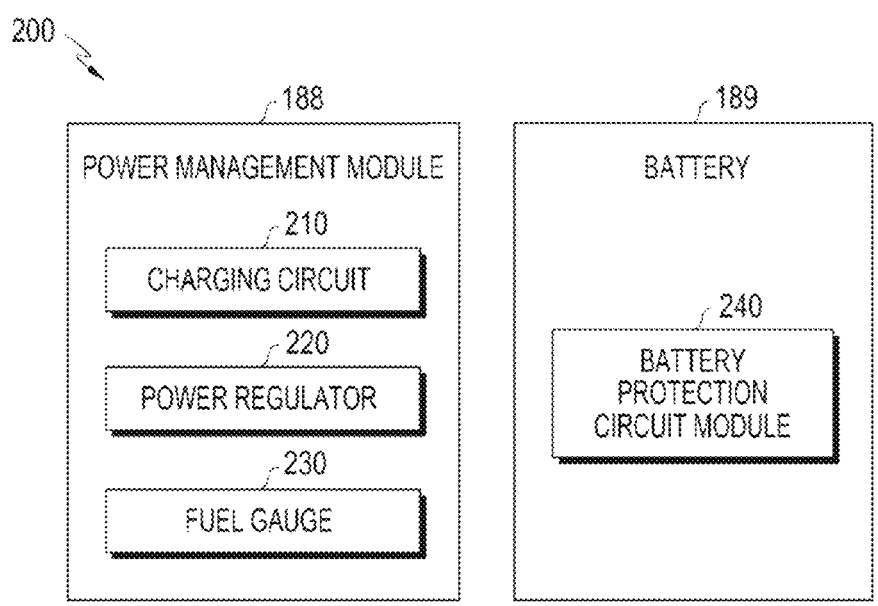
FIG. 2 is a block diagram illustrating a power management module and a battery for controlling power supply according to various embodiments.

FIG. 2 is a block diagram 200 illustrating the power management module 188 and the battery 189 in order to control power supply according to various embodiments.

Referring to FIG. 2, the power management module 188 may include a charging circuit 210, a power regulator 220, or a fuel gauge 230. The charging circuit 210 may charge the battery 189 with power supplied from an external power source of the electronic device 101. According to an embodiment, the charging circuit 210 may select a charging scheme (for example, normal charging or rapid charging) based on at least some of a type of the external power source (for example, a power adaptor, a USB, or a wireless charger), the magnitude of power chargeable from the external power source (for example, 20 watts or more), or attributes of the battery 189 and charge the battery 189 through the selected charging scheme. The external power source may be connected through, for example, the connection terminal 178 or the antenna module 197.

The power regulator 220 may generate a plurality of powers having different voltage levels or different current levels by controlling a voltage level or a current level of power supplied from the external power source or the battery 189. The power regulator 220 may control power of the external power source or the battery 189 to be a voltage or a current level suitable for each of the elements included in the electronic device 101. According to an embodiment, the power regulator 220 may be implemented in the form of a Low Drop Out (LDO) regulator or a switching regulator.

The fuel gauge 230 may measure usage state information of the battery 189 (for example, a capacity of the battery, the number of charges/discharges, a voltage, or temperature).

The power management module 188 may determine charging state information related to charging of the battery 189 (for example, lifespan, overvoltage, low voltage, overcurrent, over charge, over discharge, over heat, short circuit, or swelling) at least based partially on the measured usage state information through, for example, the charging circuit 210, the power regulator 220, or the fuel gauge 230, determine whether the battery 189 is in an abnormal state or a normal state at least based partially on the determined charging state information, and then regulate charging of the battery 189 (for example, reduce a charging current or voltage or stop charging) when it is determined that the battery 189 is in the abnormal state. According to an embodiment, at least some of the functions of the power management module 188 may be performed by an external control device (for example, the processor 120).

The battery 189 may include a battery Protection Circuit Module (PCM) 240 according to an embodiment. The battery protection circuit module 240 may perform various functions (for example, a pre-blocking function) for preventing capability deterioration or damage of the battery 189. The battery protection circuit module 240 may be additionally or alternatively configured as at least part of a Battery Management System (BMS) for performing cell balancing, battery capability measurement, measurement of the number of charges/discharges, temperature measurement, or voltage measurement.

According to an embodiment, at least some pieces of the usage state information of the battery 189 or the charging state information may be measured using a corresponding sensor (for example, a temperature sensor) among the fuel gauge 230, the power management module 188, or the sensor module 176. In this case, according to an embodiment, the corresponding sensor (for example, the temperature sensor) of the sensor module 176 may be included as the part of the battery protection circuit module 240 or may be disposed near the battery 189 as a separate device.

The electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. The electronic device according to one embodiment is not limited to the above described devices. The battery device according to various embodiments disclosed herein may include an electronic device including at least one battery that can supply power to at least one electronic device.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. In the present disclosure, the expression "A or B", "at least one of A or/and B", or "one or more of A or/and B" may include all possible combinations of the items listed. The expression "a first", "a second", "the first", or "the second" may modify corresponding elements regardless of the order or importance, and is used only to distinguish one element from another element, but does not limit the corresponding elements. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments as described herein may be implemented by software (e.g., program 140) including an instruction stored in machine-readable storage media (e.g., internal memory 136 or external memory 138). The machine is a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

According to an embodiment, a method according to various embodiments disclosed in this document may be provided while being included in a computer program product. The computer program product may be traded between a seller and a purchaser. The computer program product may be distributed in the form of a storage medium (for example, a Compact Disc Read-Only Memory (CD-ROM)) or online through an application store (for example, Play Store™). In the case of online distribution, at least some of the computer program products may be at least temporarily stored in a storage medium such as a memory of a server of a manufacturer server, a server of an application store, or a relay server, or may be temporarily generated.

Each of elements (for example, a module or a program) according to various embodiments may be configured as a single entity or a plurality thereof, and some of the corresponding sub elements may be omitted, or other sub elements may be further included in various embodiments. Alternatively or additionally, some elements (for example, a module or a program) may be integrated into one entity and equally or similarly perform a function executed by each of the corresponding elements before they are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 3:
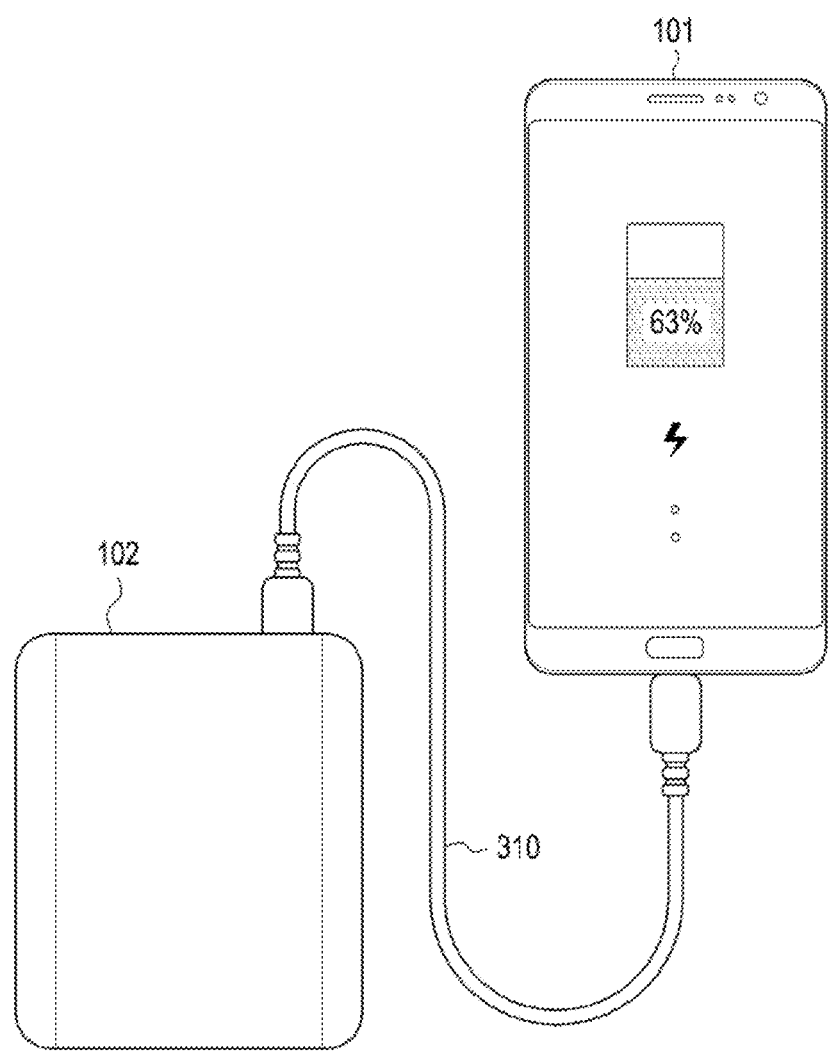
FIG. 3 illustrates a connection between a battery device and an electronic device according to various embodiments.

FIG. 3 illustrates a connection between the external electronic device (or battery device) 102 and the electronic device 101 according to various embodiments.

Referring to FIG. 3, the electronic device 101 and the battery device 102 may be connected through a cable 310. The battery device 102 may provide power to the electronic device through the cable 310 and the electronic device 101 may receive power from the battery device 102 through the cable 310. The electronic device 101 may consider the battery device 102 as an external electronic device, and the battery device 102 may consider the electronic device 101 as an external electronic device. The USB cable may include a cable having an interface of USB type-C. Alternatively, the USB cable may include a cable having an interface of USB 2.0 or USB 3.0. Although FIG. 3 illustrates the connection between the electronic device 101 and the external electronic device 102 through a wired cable, this is only an embodiment, and each of the electronic device 101 and the external electronic device 102 may have a wireless power transmission/reception module for wirelessly transmitting/receiving power therein and the electronic device 101 and the external electronic device 102 may wirelessly transmit/receive power through the wireless power transmission/reception module. The electronic device 101 and the external electronic device 102 may transmit/receive identification information for authentication through the cable 310 or wirelessly.

According to various embodiments, the battery device 102 may include a connection terminal for the connection with the electronic device 101 through the USB cable at the exterior thereof and include at least one battery inside the battery device 102. The battery device 102 may include a power regulator for regulating power supplied from the battery and supplying the regulated power to the electronic device 101 and a switch for opening or connecting a path between the battery and the electronic device connected through the connection terminal. The battery device 102 may include at least one control circuit for detecting the connection with the electronic device 101 through the connection terminal, acquiring identification information from the electronic device, boosting or reducing the voltage for power of the battery according to whether the identification information meets a predetermined condition, or providing the power of the battery to the electronic device.

According to various embodiments, the electronic device 101 may include a connection terminal for the connection with the battery device 102 through the USB cable at the exterior thereof and include at least one battery inside the electronic device 101. The electronic device 101 may detect the connection with the battery device 102 through the connection terminal and receive one of the power regulated by boosting or reducing the power which the can be output from the battery or the voltage of the battery by the battery device 102, so as to charge the battery within the electronic device 101. The electronic device 101 may transmit/receive identification information to/from the battery device 102 in order to receive the one power.

Figure 4:
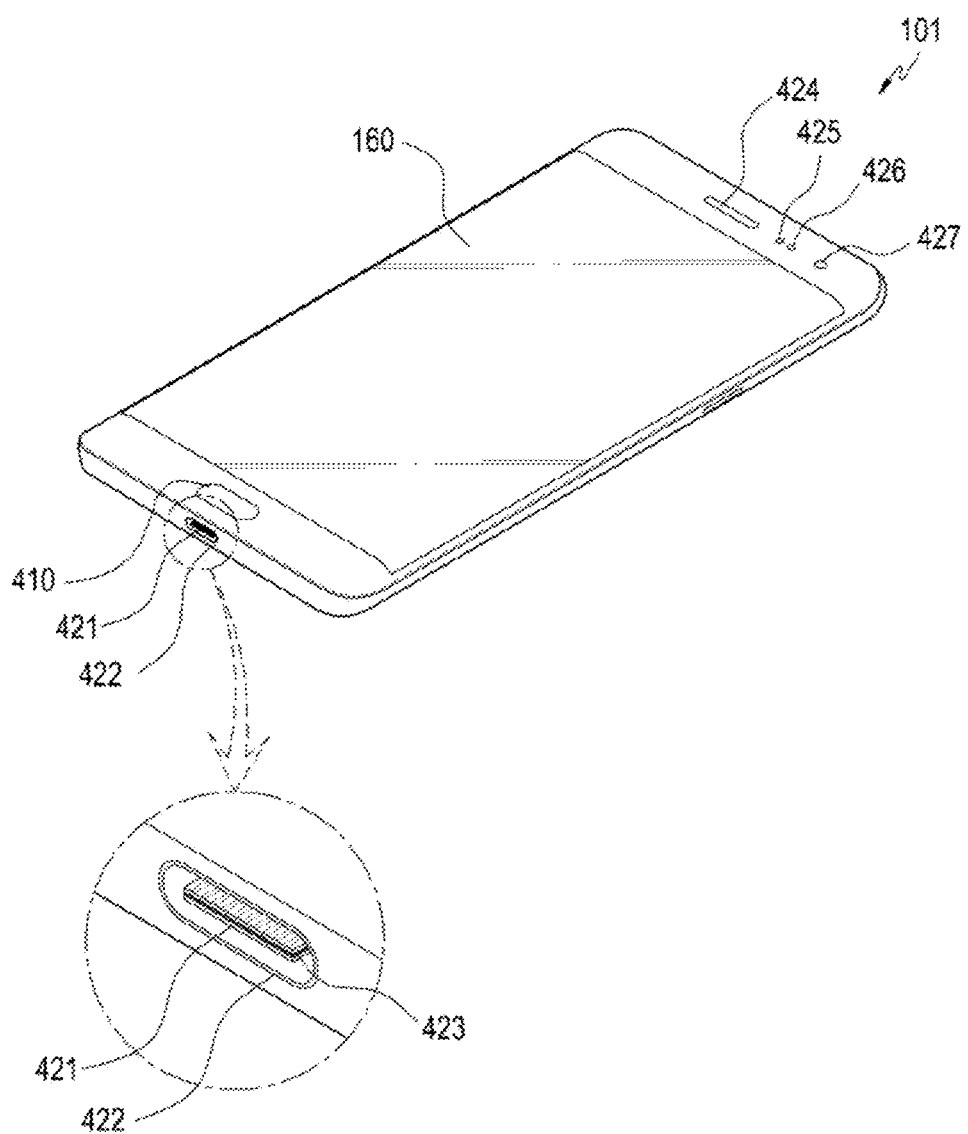
FIG. 4 is a perspective view illustrating the front surface of the electronic device according to various embodiments.

FIG. 4 is a perspective view illustrating the front surface of the electronic device 101 according to various embodiments.

Referring to FIG. 4, the electronic device 101 according to various embodiments may be a smart phone, a wearable device, a TV, or a tablet PC including a connector of USB type-C. A connector 422 of the electronic device 101 may be referred to as a receptacle and a connector of an accessory which can be coupled to the receptacle may be referred to as a plug.

As illustrated in FIG. 4, the display device 160 for detecting a touch and hovering may be disposed in the center of the front surface of the electronic device 101. The display device 160 may occupy most areas of the front surface of the electronic device 101. FIG. 4 illustrates an example in which a main home screen is displayed on the display device 160. The main home screen is the first screen that is displayed on the display device 160 when the electronic device 101 is turned on. When the electronic device 10 has several pages of different home screens, the main home screen may be the first of the several pages of home screens. Short-cut icons for executing frequently used applications, a main menu switching key, time, weather, and the like may be displayed on the home screen. The main menu switching key may display a menu screen on the display device 160. Further, a status bar for displaying states such as a battery charging state, a strength of a received signal, or a current time may be formed on the upper side of the display device 160. A home key 410 may be disposed on the lower side of the display device 160. The home key 410 may be replaced with a smart key and may not be disposed at the exterior of the electronic device 101.

According to various embodiments, a speaker 424, a proximity sensor 425, an illumination sensor 426, or a camera 427 may be provided on an upper front area of the electronic device 101. According to an embodiment, two cameras may be provided on the upper front area of the electronic device 101. The electronic device 101 may include the connector 422 (for example, the connection terminal 178 of FIG. 1) for the electrical connection with the external electronic device. The connector 422 (for example, the connection terminal 178 of FIG. 1) may be used as an interface for connecting the electronic device 101 to the battery device 102 or a power source (not shown). The electronic device 101 may be connected to the battery device 102 through a wired cable connected to the connector 422 under a control of the processor 120. According to an embodiment, the electronic device 101 may charger a battery (not shown) by receiving power form the battery device 102 through the wired cable 310 connected to the connector 422 or using a power source. The connector 422 may include USB type-C, and a contact substrate 421 may be disposed therein. The connector 422 may act as an interface of USB 2.0 or USB 3.0. A mid plate 423 having an electrically conductive characteristic may be disposed inside the contact substrate 421. A plurality of pins may be disposed on an upper surface and/or a lower surface of the contact substrate 421. The electronic device 101 may be connected to the battery device 102 through the wired cable 310 via the connector 422. In this case, the appearance of the connector 422 may be formed to be coupled to the pin of the battery device 102 upwardly or downwardly. That is, the pin of the battery device 102 may be put into the connector 422 through the wired cable 310 in any direction. Further, a plurality of pins disposed on the upper side and the lower side of the contact substrate 421 may be arranged in such a manner that power reception is possible regardless of a direction of the terminal of the wired cable 310 connected to the battery device 102.

Figure 5:
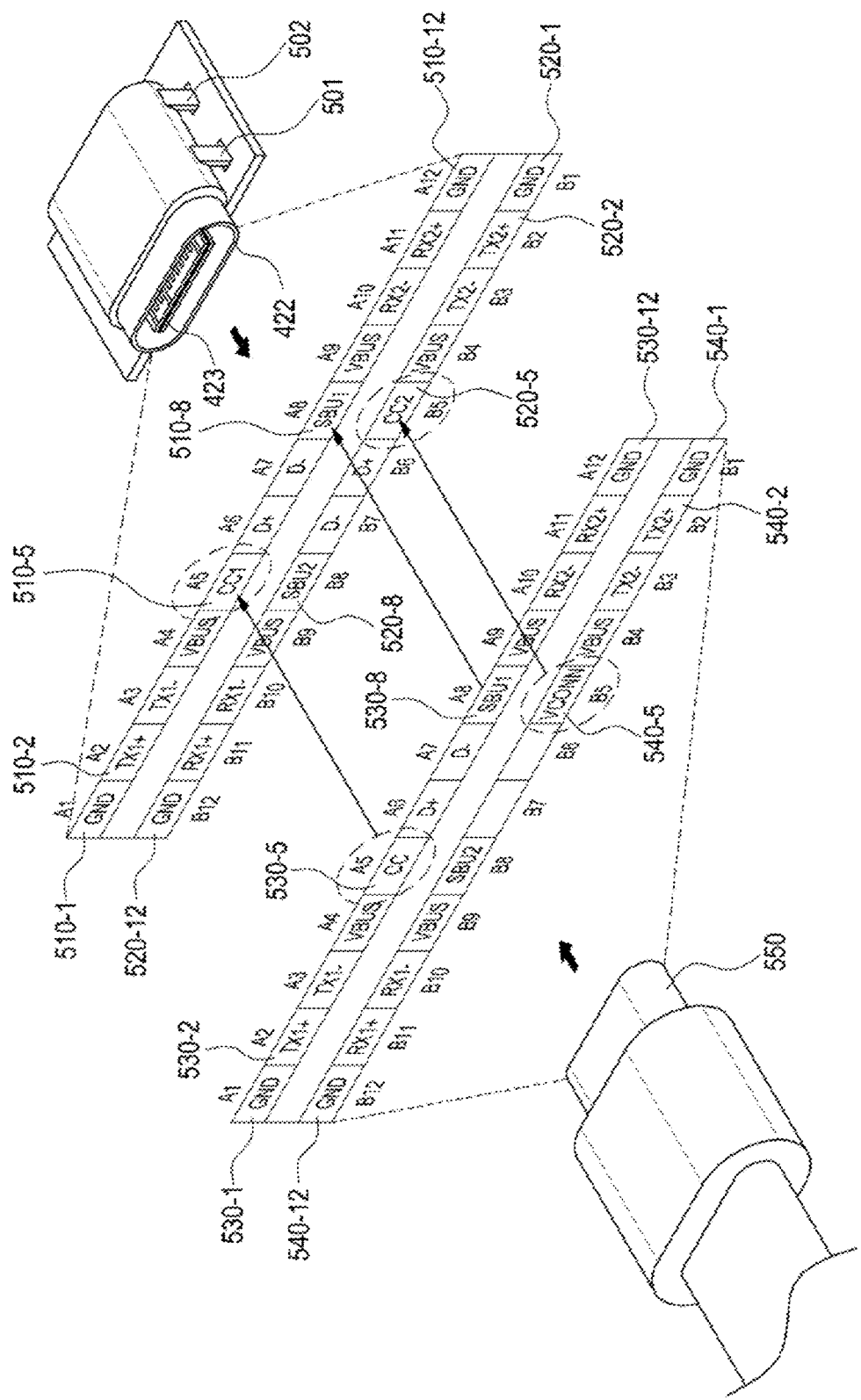
FIG. 5 illustrates functions of a plurality of terminals for an interface of USB type-C between a connection terminal of the electronic device and a connection terminal of the battery device according to various embodiments.

FIG. 5 illustrates functions of a plurality of terminals for an interface of USB type-C between the connection terminal of the electronic device 101 and the connection terminal of the battery device 102 according to various embodiments.

Referring to FIG. 5, the electronic device 101 may be electrically connected to the battery device 102 through the connector 422 (for example, the connection terminal 178 of FIG. 1). The connector 422 of the electronic device 101 may be disposed on the exterior in such a manner than a connector 550 of the wired cable 310 connected to the battery device 102 is put into the electronic device 101 in any direction, and the contact substrate 421 may be disposed inside the connector 422. The contact substrate 421 may include twelve pins 510-1, 510-2, . . . 510-12 on the upper side and twelve pins 520-1, 520-2, . . . 520-12 on the lower side. The mid plate 423 having an electrically conductive characteristic may be disposed inside the contact substrate 421. The connector 550 of the wired cable 310 may include twelve pins 530-1, 530-2, . . . 530-12 on the upper side thereof to contact the twelve pins 510-1, 510-2, . . . 510-12 disposed on the upper side of the contact substrate 421 and include twelve pins 540-1, 540-2, . . . 540-12 on the lower side thereof to contact the twelve pins 520-1, 520-2, . . . 520-12 disposed on the lower side of the contact substrate 421. The number of pins included in the connector of the wired cable 310 may vary depending on the type of electronic device. Further, the number of CC pins of the wired cable 310 may be one or two according to the type thereof. For example, in order put the connector 550 of the wired cable 310 in any direction, the arrangement order of the twelve pins disposed on the upper side may be the same as the arrangement order of the twelve pins disposed on the lower side. Due to such a structure, the user may put the wired cable 310 into the connector 422 of the electronic device 101 in a 180 degree rotated state.

The arrangement of the pins disposed on the upper side and the lower side of the contact substrate 421 may be described in [Table 1] below.

TABLE 1

| Pin | Pin | Name | Function | Note |
|---|---|---|---|---|
| A1 | B1 | GND | Power | Support for 60 W minimum (combined with all VBUS pins) |
| A2 | B2 | TX1+ | USB 3.1 or Alternate Mode | 10 Gb/s differential pair with TX1− |
| A3 | B3 | TX1− | USB 3.1 or Alternate Mode | 10 Gb/s differential pair with TX1+ |
| A4 | B4 | VBUS | Power | Support for 60 W minimum (combined with all VBUS pins) |
| A5 | B5 | CC1 | CC or VCONN | — |
| A6 | B6 | D+ | USB 2.0 | — |
| A7 | B7 | D− | USB 2.0 | — |
| A8 | B8 | SBU1 | Alternate Mode | Lower speed side band signal |
| A9 | B9 | VBUS | Power | Support for 60 W minimum (combined with all VBUS pins) |
| A10 | B10 | RX2− | USB 3.1 or Alternate Mode | 10 Gb/s differential pair with RX2+ |

TABLE 1-continued

| Pin | Pin | Name | Function | Note |
|---|---|---|---|---|
| A11 | B11 | RX2+ | USB 3.1 or Alternate Mode | 10 Gb/s differential pair with RX2− |
| A12 | B12 | GND | Power | Support for 60 W minimum (combined with all VBUS pins) |

USB type-C includes twenty four pins. The twenty four pins may be disposed in a mirrored configuration due to reversibility. Due to such a structure, the user may insert the connector 550 of the wired cable 310 connected to the battery device 102 into the connector 422 of the electronic device 101 by rotating the connector 550 180 degrees. In this case, symmetric pins may not be used together. For example, when TX1+ and TX1− are used, TX2+ and TX2− symmetric thereto may not be used. When RX1+ and RX1− are used, RX2+ and RX2− symmetric thereto may not be used. As described above, the mid plate 423 having the electrical conductivity may be included inside the contact substrate 421 of the connector 422. The contact substrate 421 may include a total of twenty four pins (for example, twelve pins on the upper side and twelve pins on the lower side), but corresponding pins may not be used at the same time. A pin to be used may be determined according to connection states of a connection cable, a connector attached to the end of the cable, and the connector 422 of the electronic device 101 connected to the connector.

Pin CC1 510-5 disposed on the upper side of the contact substrate 421 and pin CC2 520-5 disposed on the lower side may be used for detecting the purpose of the battery device 102 connected to the connector 422. For example, when the upper surface of the connector 550 of the wired cable 310 connected to the battery device 102 is upwardly put into the connector 422 of the electronic device 101 and thus pin CC1 510-5 of the electronic device 101 is connected to pin CC 530-5 of the wired cable 310, pin CC2 520-5 of the electronic device 101 may be used for supplying power (VCONN) for an IC for recognizing the battery device 102. When the upper surface of the connector 550 of the wired cable 310 connected to the battery device 102 is downwardly put into the connector 422 of the electronic device 101 and thus pin CC2 520-5 of the electronic device 101 is connected to pin CC 530-5 of the wired cable 310, pin CC1 510-5 of the electronic device 101 may be used for supplying power (VCONN) for an IC for recognizing the battery device 102. The CC pins 510-5 and 520-5 of the electronic device 101 may be connected to CC or VCONN of the battery device 102 and may support CC and VCONN.

Pin SUB 1 510-8 and pin SUB 2 520-8 of the electronic device are low-speed signal pins allocated to be used in an alternative mode. Negotiation of the alternative mode between the electronic device 101 and the battery device 102 may be used before power transmission/reception.

Figure 6A:
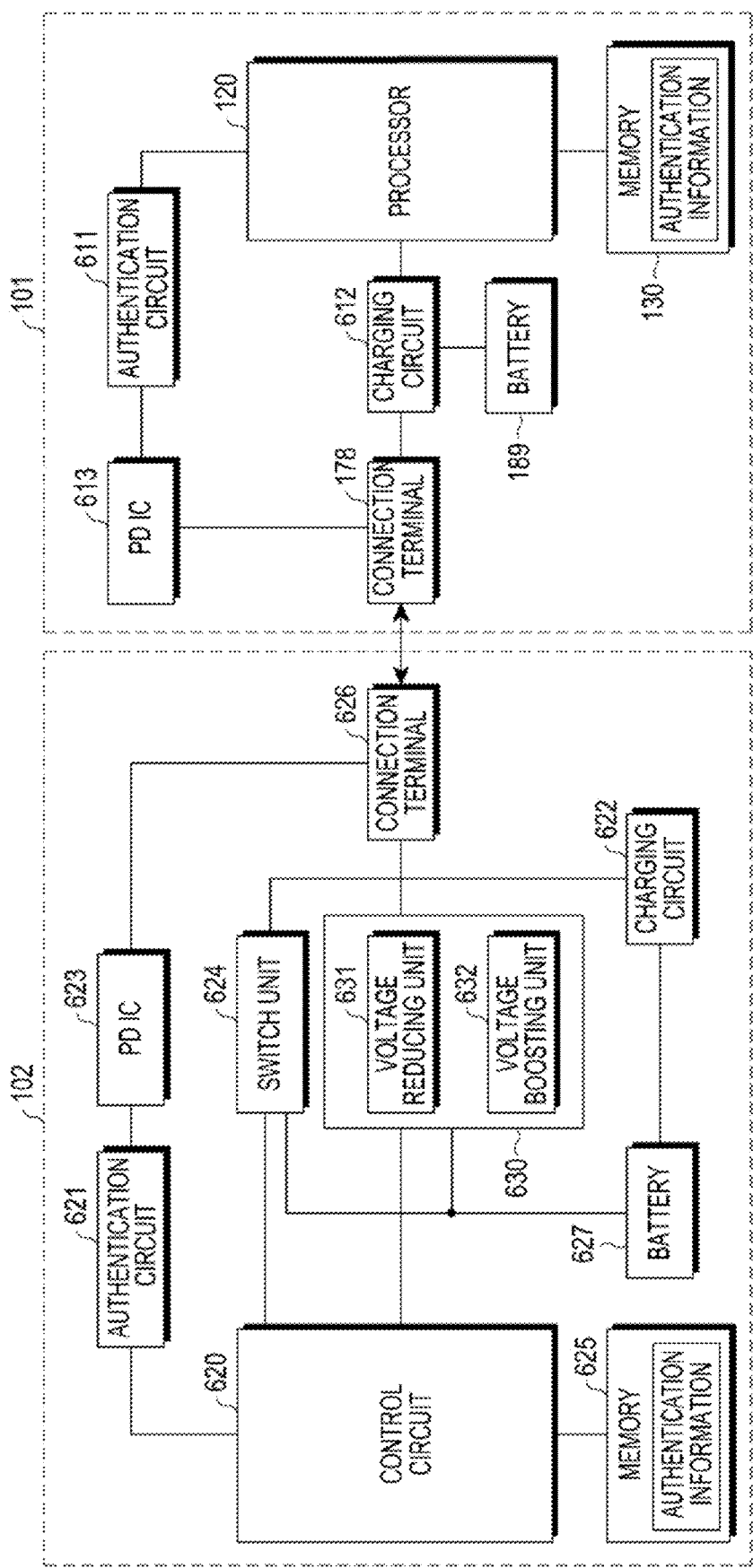
FIG. 6A is a block diagram illustrating the battery device and the electronic device according to a first embodiment.
Figure 6B:
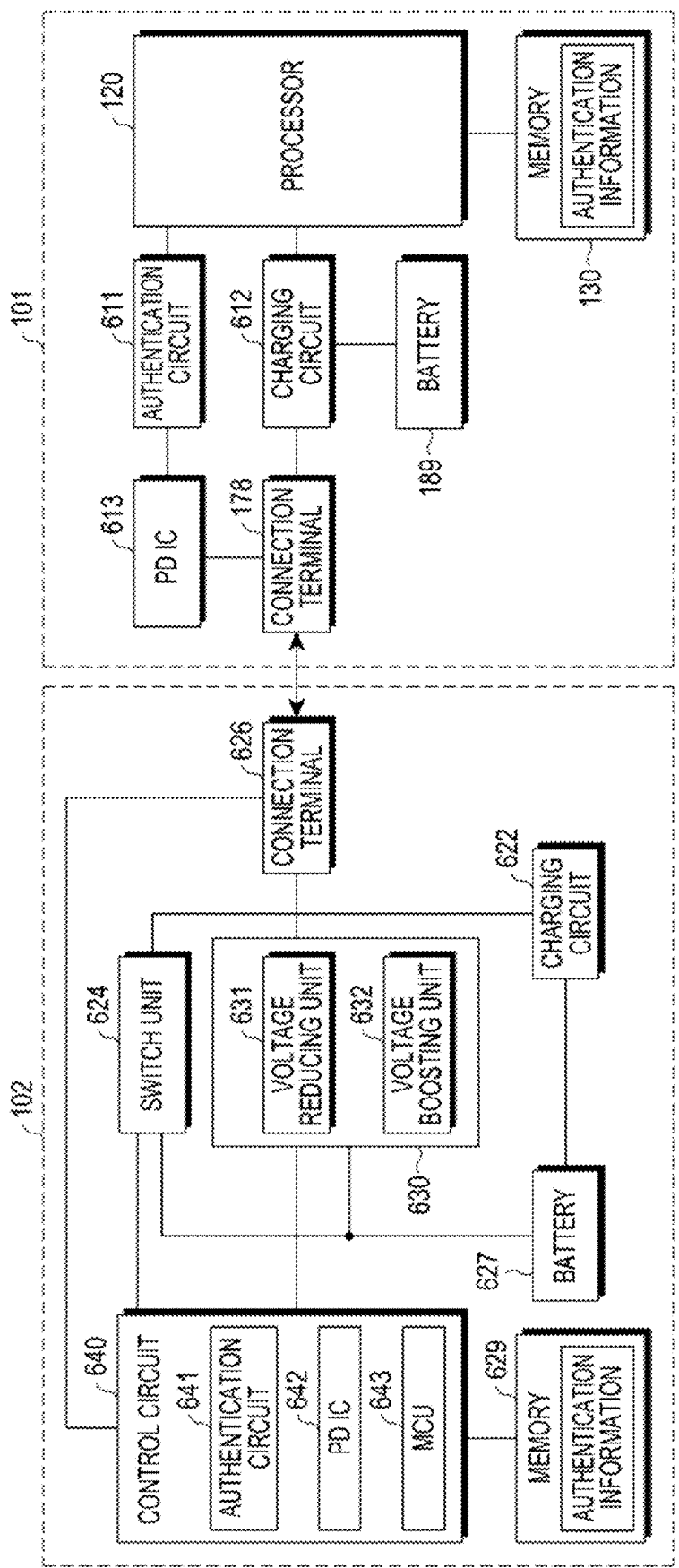
FIG. 6B is a block diagram illustrating the battery device and the electronic device according to a second embodiment.
Figure 6C:
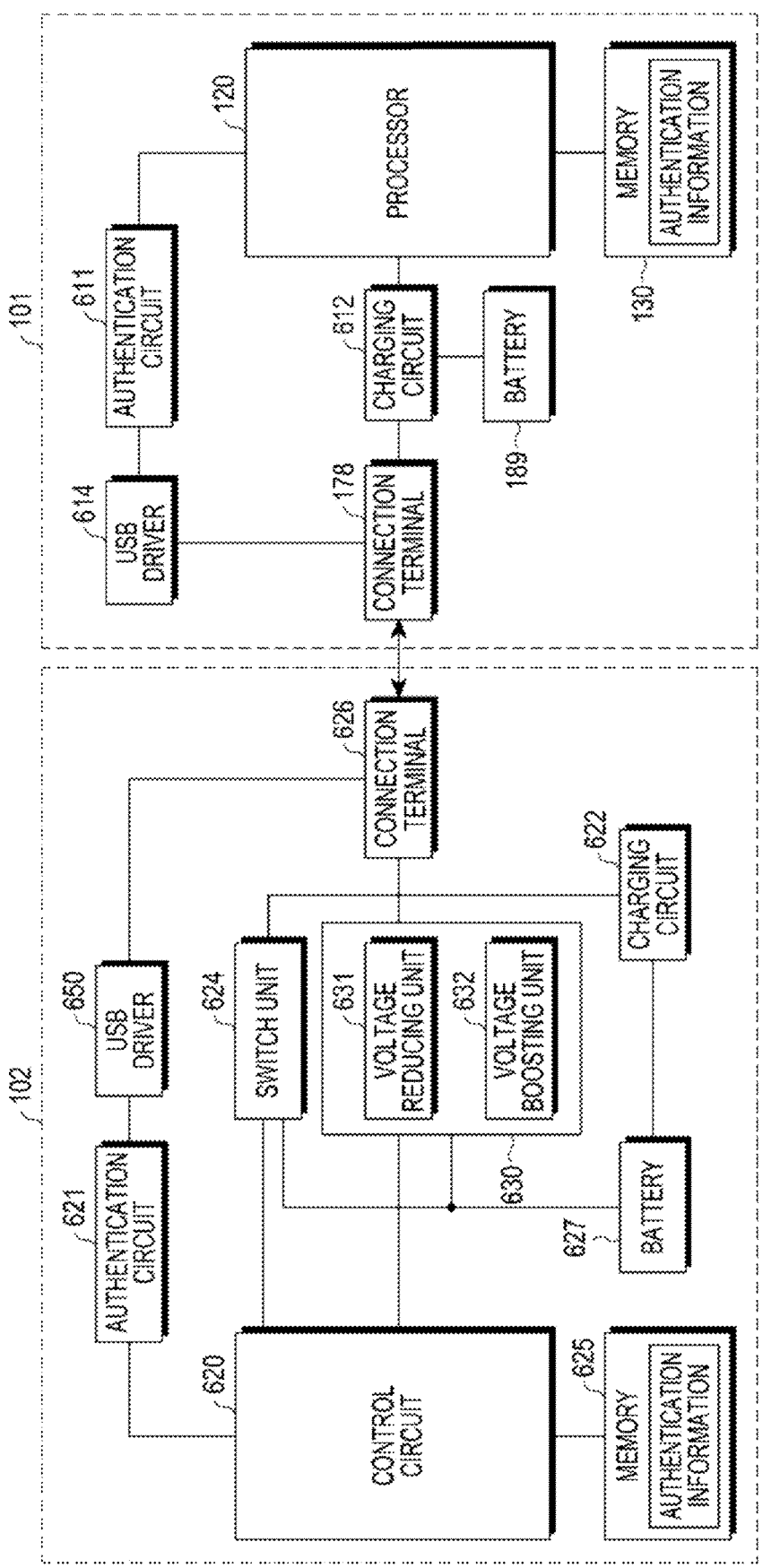
FIG. 6C is a block diagram illustrating the battery device and the electronic device according to a third embodiment.
Figure 6D:
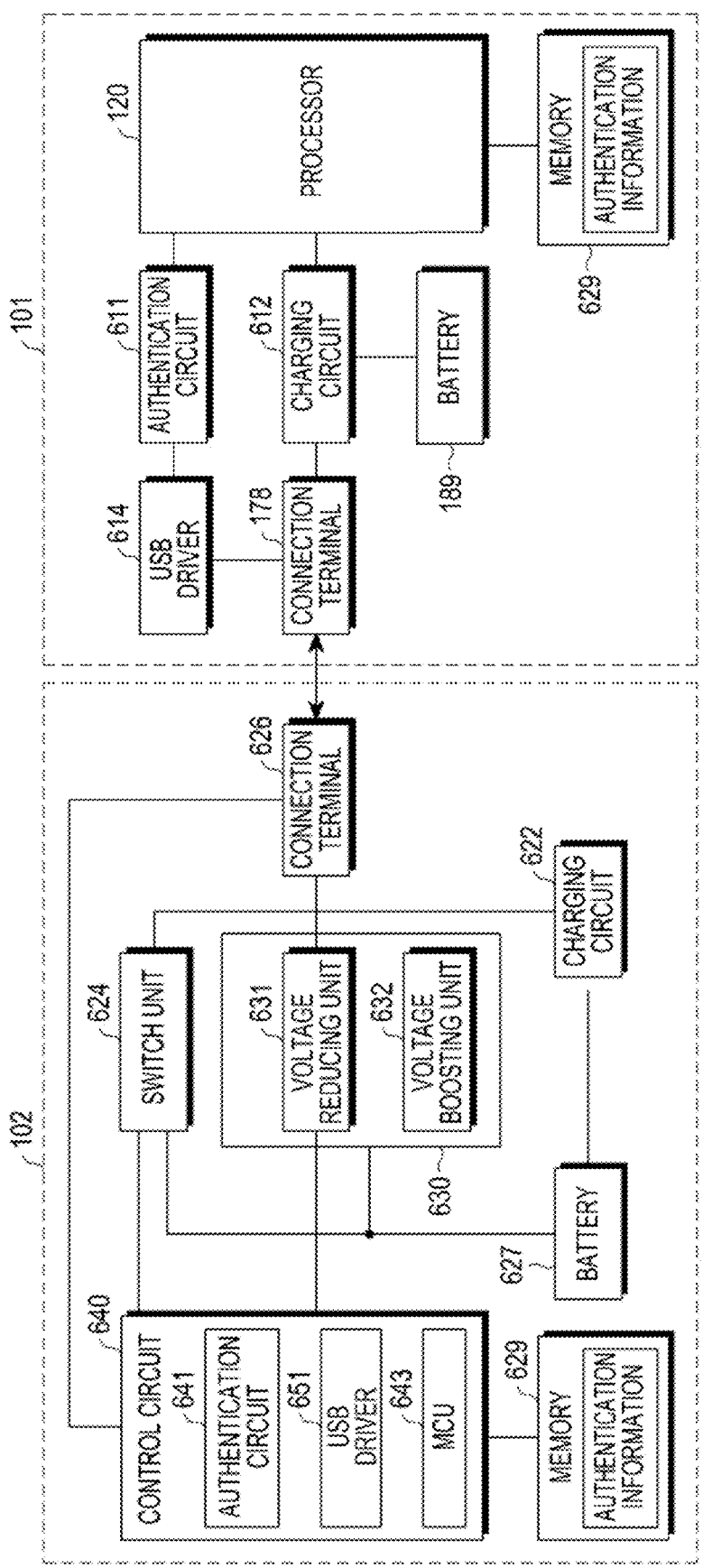
FIG. 6D is a block diagram illustrating the battery device and the electronic device according to a fourth embodiment.

FIG. 6A is a block diagram illustrating the battery device and the electronic device according to a first embodiment, FIG. 6B a block diagram illustrating the battery device and the electronic device according to a second embodiment, FIG. 6C a block diagram illustrating the battery device and the electronic device according to a third embodiment, and FIG. 6D a block diagram illustrating the battery device and the electronic device according to a fourth embodiment.

Referring to FIG. 6A, the battery device 102 may include a control circuit 620, an authentication circuit 621, a charging circuit 622, a Power Delivery Integrated Circuit (PD IC) 623, a switch unit 624, a power regulator 630, a connection terminal 626, a battery 627, and a memory 625. For reference, the battery device 102 according to various embodiments may omit at least one of the elements or further include various elements used to supply power to the electronic device 101 as well as the elements. The battery device 102 may further include a switch (not shown) for switching the connection terminal 626 to the switch unit 624 or the power regulator 630.

According to various embodiments, the control circuit 620 of the battery device 102 may control, for example, at least one other element of the battery device 102 connected to the control circuit 620 and perform various data processing and calculations. According to an embodiment, the control circuit 620 may load instructions or data received from the electronic device 101 into the memory 625, process the loaded instructions or data, and store the processing result in the memory 625. The control circuit 620 may perform at least one function or operation performed by the processor 120 of FIG. 1. According to an embodiment, the control circuit 620 may perform operations or functions performed by at least one of the authentication circuit 621 and the PD IC 623.

According to various embodiments, the control circuit 620 of the battery device 102 may detect the connection with the electronic device 101 through the connection terminal 626 and acquire identification information from the electronic device 101. When the identification information meets a first predetermined condition, the control circuit 620 may provide power regulated by the power regulator 630 to the electronic device 101 through the connection terminal 626 in the state in which the switch of the switch unit 624 is open. When the identification information meets a second predetermined condition, the control circuit 620 may provide power supplied from the battery 627 to the electronic device 101 through the connection terminal 626 in the state in which the switch of the switch unit 624 is connected. According to an embodiment, the control circuit 620 may transmit the identification information to the electronic device 101 through at least one terminal of USB type-C. The at least one terminal may include at least one of a CC terminal included in USB type-C, data (D+ and D−) terminals, transmission terminals (TX+ and TX−), reception terminals (RX+ and RX−), and a power terminal (VBUS). The control circuit 620 may transmit the identification information to the electronic device 101 through USB communication.

According to various embodiments, a Universal Serial Bus (USB) may make connection between devices (for example, the electronic device 101 and the battery device 102) through a USB cable and perform data communication or power communication. In the case of USB communication, one device is a host and the other device is a device. For example, when the electronic device 101 is connected to the battery device 102 through the USB cable, the electronic device 101 may operate as the host and the battery device 102 may operate as the device.

According to various embodiments, the control circuit 620 may perform authentication of the electronic device 101 at least based on a comparison between the acquired identification information and at least one piece of identification information stored in the memory 625 and determine a condition which the identification information meets among the first predetermined condition and the second predetermined condition based on the result of the performance of the authentication. According to an embodiment, when the acquired identification information and at least one piece of identification information stored in the memory 625 are the same as each other within a predetermined range, the control circuit 620 may determine that the authentication of the electronic device 101 is successful and that the identification information meets the second predetermined condition. According to an embodiment, when the identification information meets the second predetermined condition, the control circuit 620 may transmit the current power of the battery 627 to the electronic device 101 through the switch unit 624 without passing through a circuit for boosting or reducing the voltage of the battery 627. When it is determined that the authentication of the external electronic device is not successful, the control circuit 620 may determine that the identification information meets the first predetermined condition according to an embodiment. According to an embodiment, when the identification information meets the first predetermined condition, the control circuit 620 may regulate the power supplied from the battery 627 to power within a predetermined range through the power regulator 630 and provide the power within the predetermined range to the external electronic device through the connection terminal.

According to various embodiments, the connection terminal 626 of the battery device 102 may be electrically connected to the connection terminal 178 of the electronic device 101 through the USB cable. The USB cable may include a connector of USB type-C. The battery device 102 may include a connector of USB type-C at the exterior thereof and may be electrically connected to the connector of USB type-C. According to an embodiment, in order to supply power based on the current voltage of the battery 627 to the electronic device 101, the connection terminal 626 of the battery device 102 may use at least one terminal included in USB type-C. The terminal may include at least one of the CC terminal included in USB type-C, the data (D+ and D−) terminals, the transmission terminals (TX+ and TX−), the reception terminals (RX+ and RX−), and the power terminal (VBUS).

According to various embodiments, the PD IC 623 of the battery device 102 may transfer identification information to the electronic device 101 through the CC terminal of USB type-C. When the connection with the electronic device 101 is made through the USB cable, the PD IC 623 may transmit and receive a control signal for supplying power to and from the electronic device 101 through the CC terminal of USB type-C.

According to various embodiments, the authentication circuit 621 of the battery device 102 may perform authentication with the electronic device 101. According to an embodiment, the authentication circuit 621 of the battery device 102 may include a memory (not shown) for storing identification information of the battery device 102. The authentication circuit 621 of the battery device 102 may transfer the identification information to the electronic device 101 through the connection terminal 626. The identification information may include at least one of an identifier of the battery device 102, model information, and information indicating that the battery device 102 can provide the current voltage of the battery 627 without passing through a circuit for boosting or reducing the voltage. According to an embodiment, the identification information may be transmitted while being included in a Unstructured Vendor Defined Message (UVDM) transmitted/received in communication for power transmission based on USB type-C.

According to various embodiments, a header of the UVDM may be described in [Table 2] below.

TABLE 2

| Bit(s) | Parameter | Description |
|---|---|---|
| B31 ... 16 | Vendor ID(VID) | Unique 16-bit unsigned integer. Assigned by the USB-IF to the Vendor |
| B15 | VDM Type | 0 = Unstructured VDM |
| B14 ... 0 | Available for Vendor Use | Content of this field is defined by the vendor |

In [Table 2] above, "Vendor ID (VID)" is 16-bit integers having no sign and "VDM Type" has a value of "0". In the present disclosure, the identification may be transmitted and received while being included in "VDM Type" having "0".

According to various embodiments, the authentication circuit 621 of the battery device 102 may receive an authentication result in response to the identification information transmitted to the electronic device 101. The authentication result may include information for supplying current voltage of the battery 627 of the battery device 102 to the electronic device 101 without passing through a circuit for boosting or reducing the current voltage of the battery 627 of the battery device 102 (for example, including the voltage reduced according to power supply). According to an embodiment, the authentication result may include information indicating whether the authentication is successful or fails. According to an embodiment, the authentication circuit 621 of the battery device 102 may determine whether the authentication is successful or fails by analyzing the received authentication result.

According to various embodiments, the charging circuit 622 of the battery device 102 may perform an operation of charging power supplied from an external power source to the battery 627.

According to various embodiments, the power regulator 630 of the battery device 102 may regulate the voltage of the battery 627 to a predefined voltage and supply the regulated voltage to the electronic device 101. According to an embodiment, when the authentication is not successful, the power regulator 630 may regulate (for example, reduce or boost) the power of the battery 627 of the battery device 102 to a predefined voltage. The predefined voltage may include 5 V, 9 V, 12 V, or 20 V. According to an embodiment, the power regulator 630 may reduce the current voltage of the battery 627 to 5 V, 9 V, 12 V, or 20 V through a voltage reducing unit 631 or boost the current voltage of the battery 627 to 5 V, 9 V, 12 V, or 20 V through a voltage boosting unit 632. According to another embodiment, the power regulator 630 may boost or reduce the current voltage of the battery 627 to another voltage other than 5 V, 9 V, 12 V, or 20 V.

According to various embodiments, the switch unit 624 of the battery device 102 may include at least one Metal Oxide Semiconductor Field Effect Transistor (MOSFET). According to an embodiment, the switch unit 624 of the battery device 102 may include an On/Off switch. The switch unit 624 may bypass the voltage of the battery in the state in which the switch is connected and provide the voltage to the electronic device 101. According to an embodiment, when the authentication is successful, the switch unit 624 may provide the current voltage to the electronic device 101 without passing through the circuit for reducing or boosting the power based on the current voltage of the battery 627 of the battery device 102 (for example, including the voltage reduced according to power supply). According to an embodiment, when it is identified that the authentication is successful, the switch unit 624 may supply the current voltage of the battery 627 without any change in the voltage of the battery 627 by bypassing the power based on the current voltage of the battery 627 of the battery device 102. The switch unit 624 may include at least one MOSFET for bypassing the voltage.

According to various embodiments, the memory 625 of the battery device 102 may store identification information of the battery device 102 and identification information of at least one electronic device as well as the battery device 102. The memory 625 may store various data used by at least one element of the battery device 102 (for example, the control circuit 620, the authentication circuit 621, the charging circuit 622, the PD IC 623, the switch unit 624, the power regulator 630, the connection terminal 626, or the battery 627), for example, information used for the connection with the electronic device 101, data, and input or output data for instructions related thereto.

Referring to FIG. 6A, the electronic device 101 may include the processor 120, the connection terminal 178, the battery 189, the memory 130, an authentication circuit 611, a charging circuit 612, and a PD IC 613. For reference, the electronic device 101 according to various embodiments may omit at least one of the elements or may further include various elements used for receiving power from the battery device 102 as well as the elements.

According to various embodiments, the processor 120 of the electronic device 101 may control, for example, at least one other element of the electronic device 101 connected to the processor 120 and perform various data processing and calculations. According to an embodiment, the processor 120 may load instructions or data received from the battery device 102, process the loaded instructions or data, and store the processing result in the memory 130. The processor 120 may perform at least one function or operation performed by the processor 120 of FIG. 1.

According to various embodiments, the processor 120 of the electronic device 101 may detect the connection with the battery device 102 through the connection terminal 178, transmit identification information to the battery device 102 to allow the battery device 102 to receive one of first power which can be output from the battery 627 of the battery device 102 and second power regulated through the power regulator 630 included in the battery device 102 based on the first power, and charge the battery 189 with the one power through the charging circuit 612. According to an embodiment, the processor 120 may charge the battery 189 with the supplied first power in the state in which the switch of the switch unit 624 of the battery device 102 is connected based on the transmitted identification information. According to an embodiment, when it is identified that the authentication is successful based on the transmitted identification information, the processor 120 may receive the first power and charge the battery 189. According to an embodiment, when it is identified that the authentication is not successful based on the transmitted identification information, the processor 120 may receive the second power and charge the battery 189. According to an embodiment, when receiving the identification information from the battery device 102, the processor 120 may perform authentication of the battery device 102 at least based on a comparison between the received identification information and at least one piece of identification information stored in the memory 130. The processor 120 may receive identification information of the battery device 102 through at least one terminal of USB type-C. The at least one terminal may include at least one of a CC terminal included in USB type-C, data (D+ and D−) terminals, transmission terminals (TX+ and TX−), reception terminals (RX+ and RX−), and a power terminal (VBUS). The processor 120 may receive the identification information through USB communication.

According to various embodiments, the connection terminal 178 of the electronic device 101 may be electrically connected to the connection terminal 626 of the battery device 102 through the USB cable. The USB cable may include a connector of USB type-C. The electronic device 101 may include a connector of USB type-C at the exterior thereof and may be electrically connected to the connector of USB type-C.

According to various embodiments, the PD IC 613 of the electronic device 101 may transfer the identification information to the battery device 102 through the CC terminal of USB type-C. When the connection with the battery device 102 is made through the USB table, the PD IC 613 may transmit and receive a control signal for power supply to and from the battery device 102 through the CC terminal of USB type-C.

According to various embodiments, the authentication circuit 611 of the electronic device 101 may perform authentication with the battery device 102. According to an embodiment, the authentication circuit 611 of the electronic device 101 may store identification information of the electronic device 101 in the memory 130. The authentication circuit 611 of the electronic device 101 may transfer the identification information to the battery device 102 through the connection terminal 178.

According to various embodiments, the charging circuit 612 of the electronic device 101 may perform an operation of charging the battery 189 with the power supplied from the battery device 102. The charging circuit 612 may operate the electronic device 101 with the power charged to the battery 189.

According to various embodiments, the memory 130 of the electronic device 101 may store identification information of the electronic device 101 and identification information of at least one other electronic device other than the electronic device 101. The memory 130 may perform at least one function corresponding to at least one piece of information stored in the memory 130 of FIG. 1.

Referring to FIG. 6B, the battery device 102 and the electronic device 101 may perform the same operation as that of the battery device 102 and the electronic device 101 of FIG. 6A, respectively. As illustrated in FIG. 6B, the authentication circuit 621 and the PD IC 623 of the battery device 102 may be included as the authentication circuit 641 and the PD IC 624 of the control circuit 640. The control circuit 640 may perform at least one function or operation performed by the authentication circuit 621 and the PD IC 623 of the battery device 102 of FIG. 6A. The control circuit 640 may perform at least one function performed by the MCU 643 for performing USB communication with the electronic device 101.

According to various embodiments, the MCU 643 may perform communication and control between modules of the battery device 102 and communication and control between the battery device 102 and the electronic device 101. The MCU 643 may control transmission/reception of identification information between the electronic device 101 and the battery device 102 or perform authentication based on the transmitted/received identification information. The MCU 643 may perform control to bypass and boost or reduce the power of the battery device 102, and may control opening or connection of the switch of the switch unit 624 in order to provide the power of the battery device 102 to the electronic device 101. For reference, the battery device 102 according to various embodiments may omit at least one of the elements or further include various elements used to supply power to the electronic device 101 as well as the elements.

Referring to FIG. 6C, the battery device 102 and the electronic device 101 may perform the same operation as that of the battery device 102 and the electronic device 101 of FIG. 6A, respectively. As illustrated in FIG. 6C, the battery device 102 and the electronic device 101 may include USB drivers 650 and 614, respectively. The USB drivers 650 and 614 may provide at least one protocol for providing USB communication between the electronic device 101 and the battery device 102. The USB drivers 650 and 614 may transmit and receive identification information through the USB communication between the electronic device 101 and the battery device 102. The USB drivers 650 and 614 may provide at least one protocol for short-range communication between the electronic device 101 and the battery device 102. For reference, the battery device 102 and the electronic device 101 according to various embodiments may omit at least one of the elements or may further include various elements used for supplying power to the electronic device 101 as well as the elements.

Referring to FIG. 6D, the battery device 102 and the electronic device 101 may perform the operation as that of the battery device 102 and the electronic device 101 of FIG. 6C, respectively. As illustrated in FIG. 6D, the authentication circuit 641 and the USB driver 651 of the battery device 102 of FIG. 6C may be included as the authentication circuit 641 and the USB driver 651 of the control circuit 640. The control circuit 640 may perform at least one function or operation performed by the authentication circuit 621 and the USB driver 651 of the battery device 102 of FIG. 6C. The control circuit 640 may perform at least one function performed by the MCU 643 for performing USB communication with the electronic device 101. For reference, the battery device 102 according to various embodiments may omit at least one of the elements or further include various elements used to supply power to the electronic device 101 as well as the elements.

According to various embodiments, the battery device 102 may include the connection terminal 626; the battery 627; the power regulator 630 configured to supply power regulated using power supplied from the battery 627 to the electronic device 101 connected through the connection terminal 626; the switch unit 624 configured to open or connect a path between the battery 627 and the electronic device 101 connected through the connection terminal 626; and the control circuit 620, wherein the control circuit 620 may be configured to detect a connection with the electronic device 101 through the connection terminal 626, acquire identification information from the electronic device 101, provide power regulated using the power regulator 630 to the electronic device 101 through the connection terminal 626 in a state in which the switch unit 624 is open when the identification information meets a first predetermined condition, and provide power supplied from the battery 627 to the electronic device 101 through the connection terminal 626 in a state in which the switch unit 624 is connected when the identification information meets a second predetermined condition.

According to an embodiment, the identification information may include information related to authentication based on USB type-C or USB communication with the electronic device 101.

According to an embodiment, the control circuit 620 may be configured to transmit the identification information to the electronic device 101.

According to an embodiment, the electronic device may further include the memory 625 configured to store at least one piece of identification information, wherein the control circuit 620 may be configured to perform authentication of the electronic device 101 at least based on a comparison between the acquired identification information and the at least one piece of identification information stored in the memory 625, and determine a condition which the identification information meets among the first predetermined condition and the second predetermined condition based on a result of the authentication.

According to an embodiment, when the acquired identification information is identical to the at least one piece of identification information stored in the memory 625 within a predetermined range, the control circuit 620 is configured to determine that authentication of the electronic device 101 is successful and determines that the identification information meets the second predetermined condition.

According to an embodiment, when the identification information meets the second predetermined condition, the control circuit 620 may be configured to transmit current power of the battery 627 to the electronic device 101 without passing through a circuit for boosting or reducing the voltage of the battery 627.

According to an embodiment, when the acquired identification information is different from the at least one piece of identification information stored in the memory, the control circuit 620 may be configured to determine that authentication of the external electronic device is not successful and determine that the identification information meets the first predetermined condition.

According to an embodiment, when the identification information meets the first predetermined condition, the control circuit 620 may be configured to regulate the power supplied from the battery 627 to power within a predetermined range through the power regulator and provide the power within the predetermined range to the external electronic device through the connection terminal.

According to an embodiment, the switch unit 624 may include at least one Metal Oxide Semiconductor Field Effect Transistor (MOSFET) or an On/Off switch.

According to various embodiments, the electronic device 101 may include the connection terminal 178; the battery 189; the charging circuit 612; and the processor 120, wherein the processor 120 may be configured to detect a connection with the battery device 102 through the connection terminal 178, transmit identification information to the battery device 102 in order to allow the battery device 102 to output one of first power which can be output from the battery 627 of the battery device 102 and second power regulated through the power regulator 630 included in the battery device 102 based on the first power, and charge the battery 189 with the one power through the charging circuit 612.

According to an embodiment, the identification information may include information related to authentication based on USB type-C or USB communication with the battery device 102.

According to an embodiment, the processor 120 may be configured to charge the battery 189 with the first power supplied in a state in which the switch unit 624 of the battery device 102 is connected based on the transmitted identification information.

According to an embodiment, when it is identified that authentication is successful based on the transmitted identification information, the processor 120 may be configured to receive the first power and charge the battery 189, and the first power corresponds to power actually identical to current power of the battery 627 without passing through a circuit for boosting or reducing the voltage of the battery 627 of the battery device 102.

According to an embodiment, when is identified that authentication is not successful based on the transmitted identification information, the processor 120 may be configured to receive the second power and charge the battery 189, and the second power is obtained by regulating power supplied from the battery to power within a predetermined range through the power regulator.

According to an embodiment, the electronic device may further include the memory 130 configured to store at least one piece of identification information, wherein, when identification information is received from the battery device 102, the processor 120 may be configured to perform authentication of the battery device 102 at least based on a comparison between the received identification information and the at least one piece of identification information stored in the memory 130.

According to an embodiment, the identification information may be transmitted/received while being included in a Unstructured Vendor Defined Message (UVDM) transmitted/received through a Configuration Channel (CC) terminal of USB type-C.

According to various embodiments, the electronic device 101 may include the connection terminal 178 for connecting to the battery device 102, the battery 189, the charging circuit 612, and the processor 120, wherein the processor 120 may be configured to detect the connection with the battery device 102 through the connection terminal 178, acquire identification information from the battery device 102, charge the battery 627 through the charging circuit 612 using power output from the battery device 102 when the identification information meets a first predetermined condition, and charge the battery 189 through the charging circuit 612 using one of first power which can be output from a battery 189 of the battery device 102 and second power regulated through the power regulator 630 included in the battery device 102 based on the first power when the identification information meets a second predetermined condition.

According to an embodiment, the identification information may include information related to authentication based on USB type-C or USB communication with the battery device 102.

According to an embodiment, the electronic device may further include the memory 130 configured to store at least one piece of identification information, wherein the processor 120 may be configured to perform authentication of the battery device 102 at least based on a comparison between the acquired identification information and the at least one piece of identification information stored in the memory 130.

According to an embodiment, when the identification information meets the second predetermined condition, the processor 120 may be configured to receive the first power and charge the battery 189, and the first power corresponds to power actually identical to current power of the battery 627 without passing through a circuit for boosting or reducing a voltage of the battery 627 of the battery device 102.

According to an embodiment, when the identification information meets the first predetermined condition, the processor 120 may be configured to receive the second power and charge the battery 189, and the second power is power obtained by boosting or reducing a current voltage of the battery 627 of the battery device 102 to a predetermined voltage.

Figure 7A:
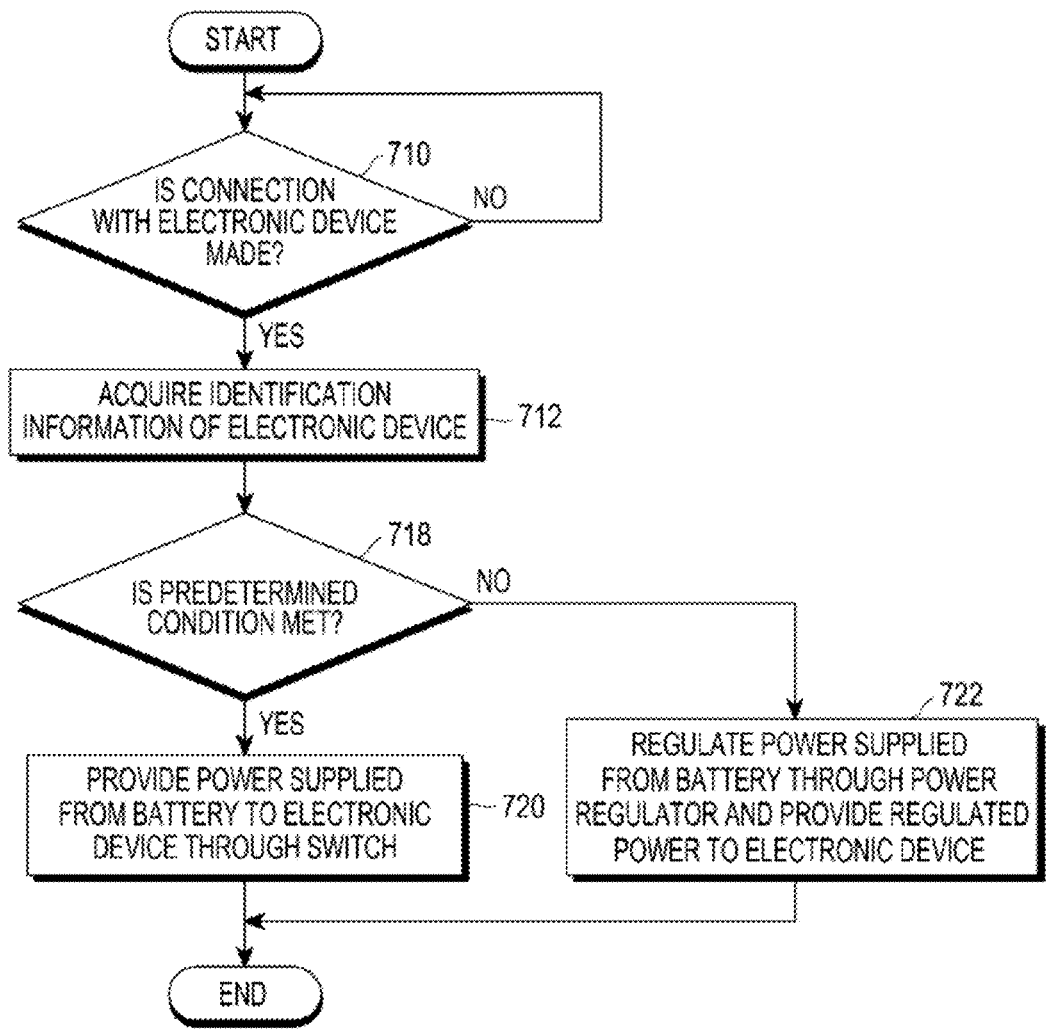
FIG. 7A illustrates an example showing an operation of supplying power of the battery device according to various embodiments.

FIG. 7A illustrates an example showing an operation of supplying power of the battery device according to various embodiments.

More specifically, FIG. 7A illustrates an example of a process in which the battery device 102 acquires identification information from the electronic device 101, performs authentication of the electronic device 101, and supplies power to the electronic device 101 based on the authentication result.

According to various embodiments, in operation 710, the battery device 102 may detect a connection with the electronic device 101. The battery device 102 may be physically connected to the electronic device 101. The battery device 102 may be physically connected to the electronic device 101 through a USB cable. The battery device 102 may include a connector of USB type-C at the exterior thereof and may be physically connected to the electronic device 101 through the USB cable. The battery device 102 may be connected to the electronic device 101 based on USB type-C or USB communication.

According to various embodiments, when the battery device 102 is connected to the electronic device 101 through the USB cable, the battery device 102 (for example, the control circuit 620 or 640) may receive information on the electronic device 101. The information may be transmitted through a particular pin of USB type-C. The information may be transmitted through a particular pin of USB type-C. When the battery device 102 is physically connected to the electronic device 101, the battery device 102 may receive (or request) at least one of an identifier of the electronic device 101, power information, information used for determining a role, and information used for determining a communication method from the electronic device 101. According to the reception (or request), the battery device 102 may determine the role with the electronic device 101. The battery device 102 (for example, the control circuit 640) may determine the role about whether to operate in a host mode or a device mode based on the information. According to an embodiment, when the electronic device 101 is connected to the battery device 102 through the USB cable, the electronic device 101 may be determined as a host or a master based on the role for power. According to an embodiment, when the electronic device 101 is connected to the battery device 102 through the USB cable, the battery device 102 may operate in the device mode.

According to various embodiments, in operation 712, the battery device 102 may acquire identification information of the electronic device. According to an embodiment, the battery device 102 (for example, the control circuit 620 or 640) may acquire identification information of the battery device 102 from the electronic device 101 through the USB cable. According to an embodiment, the battery device 102 (for example, the control circuit 620 or 640) may receive identification information of the battery device 102 from the electronic device 101 through at least one terminal included in USB type-C or USB communication. According to an embodiment, the battery device 102 may determine the role with the electronic device 101 based on the identification information. The battery device 102 (for example, the control circuit 640) may determine the role about whether to operate in a host mode or a device mode based on the information. According to an embodiment, when the electronic device 101 is connected to the battery device 102 through the USB cable, the electronic device 101 may be determined as a host or a master based on the role for power. According to an embodiment, when the electronic device 101 is connected to the battery device 102 through the USB cable, the battery device 102 may operate in the device mode. According to an embodiment, the identification information may include at least one of an identifier of the electronic device 101, model information, and information indicating that the electronic device 101 can provide the current voltage of the battery 627 of the battery device 102 without passing through a circuit for boosting or reducing the voltage. According to an embodiment, the identification information may be received while being included in a UVDM based on USB type-C. According to an embodiment, in order to supply power based on the current voltage of the battery 627 of the battery device 102 to the electronic device 101, the battery device 102 (for example, the control circuit 620 or 640) may receive identification information of the electronic device 101 from the electronic device 101 through at least one terminal included in USB type-C. The terminal may include at least one of the CC terminal included in USB type-C, the data (D+ and D−) terminals, the transmission terminals (TX+ and TX−), the reception terminals (RX+ and RX−), and the power terminal (VBUS). According to an embodiment, the battery device 102 (for example, the control circuit 620 or 640) may perform authentication based on the identification information received from the electronic device 101 and transmit the authentication result to the electronic device 102.

According to various embodiments, in operation 718, the battery device 102 may determine whether the acquired identification meets a predetermined condition. The battery device 102 may perform authentication based on the identification information received from the electronic device 102 and determine whether the acquired identification information meets the predetermined condition. The predetermined condition may include a condition under which power regulated through the power regulator 630 is provided to the electronic device (for example, a first predetermined condition) in the state in which the switch of the switch unit 624 is open or power supplied from the battery 627 of the battery device 102 is provided to the electronic device (for example, a second predetermined condition) in the state in which the switch of the switch unit 624 is connected. According to an embodiment, when the identification information received from the electronic device 101 meets the first predetermined condition, the battery device 102 may open the switch of the switch unit 624 of the battery device 102. According to an embodiment, the battery device 102 may regulate the power of the battery 627 to a predetermined voltage through the power regulator 630 in the state in which the switch of the switch unit 624 is open. The power regulator 630 may include the voltage reducing unit 631 for reducing the voltage and the voltage boosting unit 632 for boosting the voltage. According to another embodiment, when the identification information received from the electronic device 101 meets the second predetermined condition, the switch of the switch unit 624 of the battery device 102 may be connected (or short-circuited). According to an embodiment, the battery device 102 may control the switch unit 624 to supply the power supplied from the battery 627 to the electronic device in the state in which the switch of the switch unit 624 is connected.

According to various embodiments, in operation 720, the battery device 102 may provide the power supplied form the battery to the electronic device 101 through the switch. According to an embodiment, the battery device 102 may supply the power based on the current voltage of the battery 627 to the electronic device 101. According to an embodiment, when the identification information meets the second predetermined condition (for example, when the authentication is successful), the battery device 102 may supply the power based on the current voltage of the battery 627 of the battery device 102 (for example, including the voltage reduced according to power supply) to the electronic device 101. According to an embodiment, the battery device 102 may supply the power based on the current voltage of the battery 627 of the battery device 102 to the electronic device 101 without passing through a circuit for boosting or reducing the voltage. According to an embodiment, when it is identified that the authentication is successful, the battery device 102 may supply the power based on the current voltage of the battery 627 of the battery device 102 without any change in the voltage of the battery 627 by bypassing the power. The switch unit 624 may include at least one MOSFET for bypassing the voltage.

According to various embodiments, in operation 722, the battery device 102 may regulate the power supplied from the battery through the power regulator 630 and provide the regulated power to the electronic device 101. According to an embodiment, the battery device 102 may regulate the voltage of the battery 627 to a predefined voltage and supply the regulated voltage to the electronic device 101. According to an embodiment, when the identification information meets the first predetermined condition (for example, when the authentication is not successful), the battery device 102 may regulate the power of the battery of the battery device 102 to a predefined voltage through the power regulator 630 and provide the power based on the regulated voltage to the electronic device 101. The predefined voltage may include 5 V, 9 V, 12 V, or 20 V. According to an embodiment, when it is identified that the authentication is not successful, the battery device 102 may boost or reduce the current voltage of the battery 627 to 5 V, 9 V, 12 V, or 20 V and provide the boosted or reduced voltage to the electronic device 101. According to another embodiment, when it is identified that the authentication is not successful, the battery device 102 may boost or reduce the current voltage of the battery 627 to another voltage other than 5 V, 9 V, 12 V, or 20 V and provide the boosted or reduced voltage to the electronic device 101.

Figure 7B:
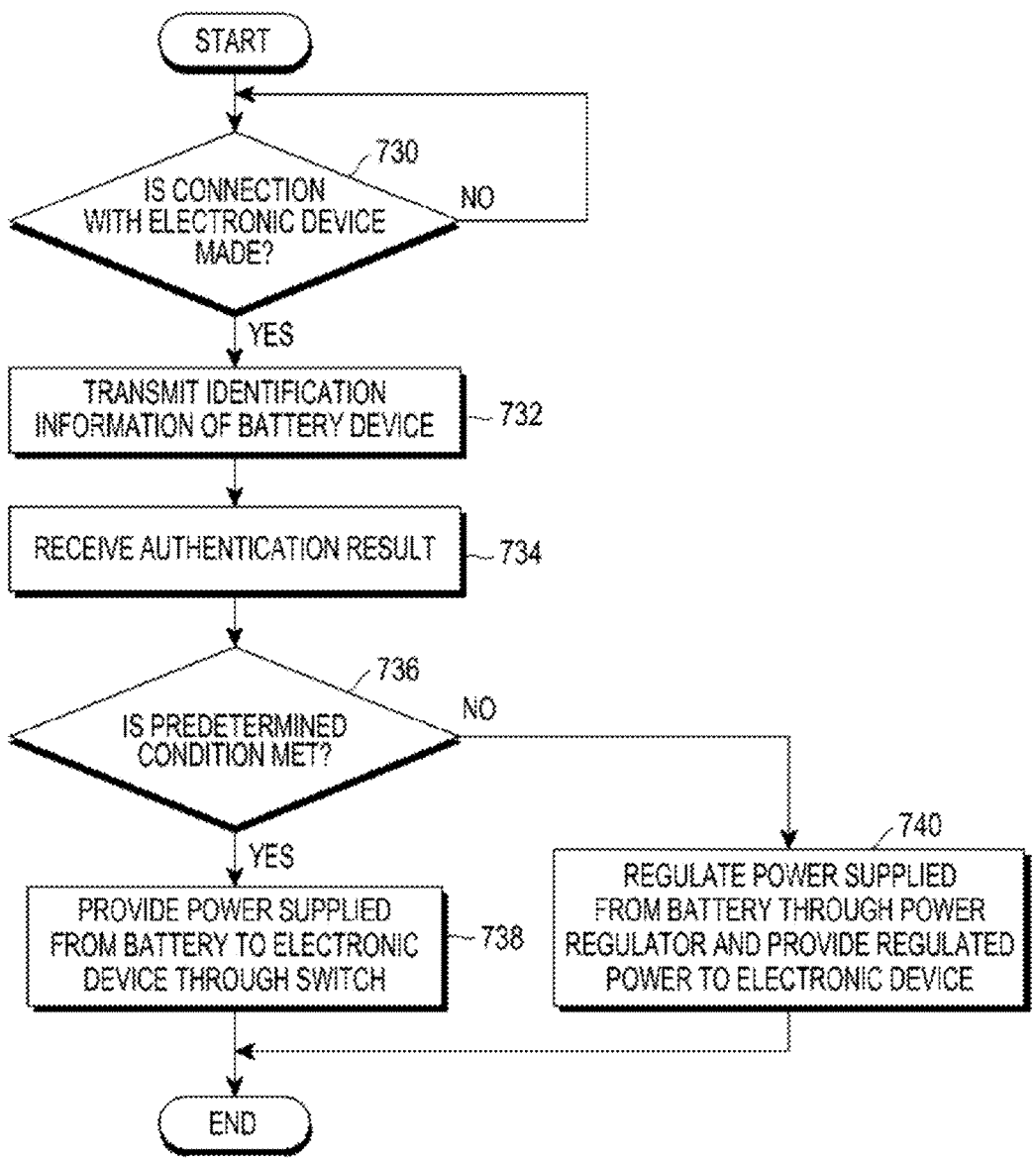
FIG. 7B illustrates another example of the operation in which the battery device supplies power according to various embodiments.

FIG. 7B illustrates another example of the operation in which the battery device supplies power according to various embodiments.

More specifically, FIG. 7B illustrates an example of a process in which the battery device 102 transmits identification information to the electronic device 101 and supplies power to the electronic device 101 based on the result of authentication performed in the electronic device 101.

According to various embodiments, in operation 730, the battery device 102 may detect a connection with the electronic device 101. In operation 730, at least one operation, function, or characteristic performed in operation 710 of FIG. 7A may be performed.

According to various embodiments, in operation 732, the battery device 102 may transmit identification information of the battery device 102 to the electronic device. According to an embodiment, the battery device 102 (for example, the control circuit 620 or 640) may transmit identification information of the battery device 102 to the electronic device 101 through a USB cable. According to an embodiment, the battery device 102 (for example, the control circuit 620 or 640) may transmit the identification information of the battery device 102 to the electronic device 101 through at least one terminal included in USB type-C or USB communication.

According to an embodiment, the identification information may include at least one of an identifier of the battery device 102, model information, and information indicating that the battery device 102 can provide the current voltage of the battery 627 without passing through a circuit for boosting or reducing the voltage. According to an embodiment, the identification information may be transmitted while being included in a UVDM based on USB type-C. According to an embodiment, in order to supply power based on the current voltage of the battery 627 of the battery device 102 to the electronic device 101, the battery device 102 (for example, the control circuit 620 or 640) may transmit identification information of the battery device 102 to the electronic device 101 through at least one terminal included in USB type-C or USB communication. The terminal may include at least one of the CC terminal included in USB type-C, the data (D+ and D−) terminals, the transmission terminals (TX+ and TX−), the reception terminals (RX+ and RX−), and the power terminal (VBUS).

According to an embodiment, the battery device 102 (for example, the control circuit 620 or 640) may transmit the identification information to the electronic device 101 in order to supply the current voltage of the battery 627 of the battery device 102 without passing through the circuit for boosting or reducing the current voltage of the battery 627 of the battery device 102. The electronic device 101 may perform authentication based on the identification information received from the battery device 102 and transmit the authentication result to the battery device 102.

According to various embodiments, in operation 734, the battery device 102 may receive the authentication result. According to an embodiment, the battery device 102 may receive the authentication result based on the identification information received from the electronic device 101. The authentication result may include information for supplying the current voltage of the battery 627 of the battery device 102 (for example, including the voltage reduced according to power supply) to the electronic device 101 without passing through the circuit for boosting or reducing the voltage of the battery 627 of the battery device 102. The authentication result may include information on whether to provide power regulated through the power regulator 630 to the electronic device in the state in which the switch of the switch unit 624 is open (for example, a first predetermined condition) or to provide power supplied from the battery 627 of the battery device 102 in the state in which the switch of the switch unit 624 is connected (for example, a second predetermined condition). According to an embodiment, the authentication result may include information indicating whether the authentication is successful or fails.

According to various embodiments, in operation 736, the battery device 102 may determine whether the authentication result meets the predetermined condition. According to an embodiment, the battery device 102 may receive the authentication result in response to the identification information transmitted to the electronic device 101. According to an embodiment, the battery device 102 may determine whether the authentication is successful or fails by analyzing the received authentication result. The predetermined condition may include a condition under which power regulated through the power regulator 630 is provided to the electronic device (for example, a first predetermined condition) in the state in which the switch of the switch unit 624 is open or power supplied from the battery 627 of the battery device 102 is provided to the electronic device (for example, a second predetermined condition) in the state in which the switch of the switch unit 624 is connected. According to an embodiment, the battery device 102 may determine that the identification information meets the first predetermined condition when it is determined that the authentication result is not successful, and determine that the identification information meets the second predetermined condition when it is determined that the authentication result is successful.

According to various embodiments, in operation 739, the battery device 102 may provide power supplied from the battery to the electronic device through the switch. According to various embodiments, in operation 740, the battery device 102 may regulate the power supplied from the battery through the power regulator and provide the regulated power to eh electronic device. In operations 738 and 740, at least one operation, function, or characteristic performed in operations 720 and 722 of FIG. 7A may be performed.

Figure 7C:
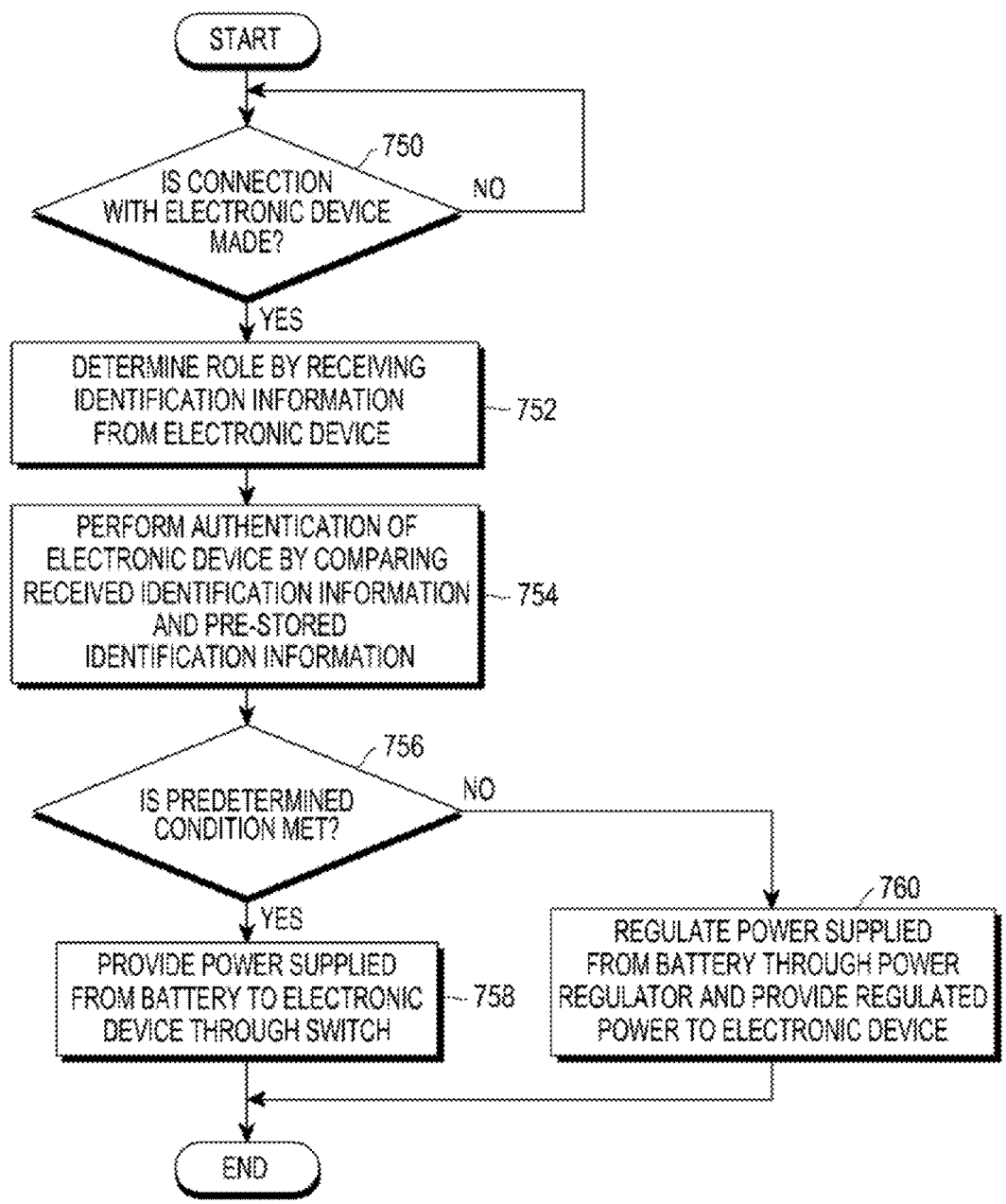
FIG. 7C is a flowchart illustrating an operation in which the battery device supplies power to the electronic device after receiving identification information of the electronic device and performing authentication according to various embodiments.

FIG. 7C is a flowchart illustrating an operation in which the battery device supplies power to the electronic device after receiving identification information of the electronic device and performing authentication according to various embodiments.

According to various embodiments, in operation 750, the battery device 102 may detect a connection with the electronic device 101. According to various embodiments, in operation 750, at least one operation, function, or characteristic performed in operation 710 of FIG. 7A and operation 730 of FIG. 7B may be performed.

According to various embodiments, in operation 752, the battery device 102 may receive identification information from the electronic device 101 and determine a role. According to an embodiment, when the battery device 102 is connected to the electronic device 101 through a USB cable, the battery device 102 (for example, the control circuit 620 or 640) may receive information on the electronic device 101. The information may be transmitted through a particular pin of USB type-C or USB communication. According to another embodiment, when the battery device 102 is connected to the electronic device 101 through the USB cable, the battery device 102 (for example, the control circuit 620 or 640) may transmit information on the battery device 102 to the electronic device 101.

According to various embodiments, when the battery device 102 is physically connected to the electronic device 101, the battery device 102 may make a request for information on the electronic device 101 to the electronic device 101 through the USB cable. The information may be transmitted through a particular pin of USB type-C or USB communication. When the battery device 102 is physically connected to the electronic device 101, the battery device 102 may receive (or request) at least one of an identifier of the electronic device 101, power information, information used for determining a role, and information used for determining a communication method from the electronic device 101 through a Configuration Channel (CC) terminal of USB type-C. In response to the request, the battery device 102 may receive at least one of the identifier of the electronic device 101, the power information, the information used for determining the role, and the information used for determining a communication method from the electronic device 101. According to an embodiment, the battery device 102 may determine the role in communication with the electronic device 101 based on the received information. The battery device 102 (for example, the processor 120) may determine the role about whether to operate in a host mode or a device mode based on the received information in response to the request. According to an embodiment, when the electronic device 101 is connected to the battery device 102 through the USB cable, the battery device 102 may operate in the device mode.

According to various embodiments, the battery device 102 may determine the role based on the identification information received from the electronic device 101. According to an embodiment, the battery device 102 (for example, the control circuit 620 or 640) may receive the identification information of the electronic device 101 from the electronic device 101 through the USB cable. According to an embodiment, the battery device 102 (for example, the control circuit 620 or 640) may receive the identification information of the electronic device 101 through at least one terminal included in USB type-C or USB communication.

According to an embodiment, the identification information may include at least one of an identifier of the electronic device 101, model information, and information indicating that the electronic device 101 can receive the current voltage of the battery 627 of the battery device 102 without passing through a circuit for boosting or reducing the voltage. According to an embodiment, the identification information may be received while being included in a UVDM based on USB type-C. According to an embodiment, in order to supply power based on the current voltage of the battery 627 of the battery device 102 to the electronic device 101, the battery device 102 may receive identification information of the electronic device 101 from the electronic device 101 through at least one terminal included in USB type-C. The terminal may include at least one of the CC terminal included in USB type-C, the data (D+ and D−) terminals, the transmission terminals (TX+ and TX−), the reception terminals (RX+ and RX−), and the power terminal (VBUS). According to an embodiment, the battery device 102 (for example, the control circuit 620 or 640) may receive the identification information from the electronic device 101 in order to supply the current voltage of the battery 627 of the battery device 102 without passing through the circuit for boosting or reducing the current voltage of the battery 627 of the battery device 102.

According to various embodiments, in operation 754, the battery device 102 may compare the received identification information and pre-stored identification information and perform authentication of the electronic device 101. According to an embodiment, the battery device 102 (for example, the control circuit 620 or 640) may perform authentication of the electronic device 101 at least based on the comparison between the identification information received from the electronic device 101 and at least one piece of identification information pre-stored in the memory 625. The battery device 102 may perform authentication based on the identification information received from the electronic device 101 and transmit the authentication result to the electronic device 101. The authentication may be performed to determine whether to provide the current voltage of the battery 627 of the battery device 102 without passing through the circuit for boosting or reducing the current voltage of the battery 627 (for example, including the voltage reduced according to power supply) or to boost or reduce the current voltage of the battery 627 of the battery device 102 (for example, including the voltage reduced according to power supply) and then supply the boosted or reduced voltage to the electronic device 101. According to an embodiment, the authentication result may include information indicating whether the authentication is successful or fails.

According to various embodiments, in operation 756, the battery device 102 may determine whether authentication is successful. According to an embodiment, the battery device 102 may determine whether authentication is successful or fails at least based on a comparison between the received identification information and at least one piece of identification information pre-stored in the memory 625. At least one piece of identification information pre-stored in the memory 625 may include identification information on at least one other electronic device other than the electronic device 101.

According to various embodiments, in operation 758, the battery device 102 may supply power supplied from the battery to the electronic device. According to various embodiments, in operation 760, the battery device 102 may regulate the power supplied from the battery through the power regulator and provide the regulated power to eh electronic device. In operations 758 and 760, at least one operation, function, or characteristic performed in operations 720 and 722 of FIG. 7A and operations 738 and 740 of FIG. 7B may be performed.

According to various embodiments, the battery device including the connection terminal 626, the battery 627, the power regulator 630 configured to supply power regulated using power supplied from the battery 627 to an external electronic device connected through the connection terminal; the switch configured to open or connecting a path between the battery and the external electronic device connected through the connection terminal; and the control circuit, wherein the control circuit may include an operation of detecting a connection with the external electronic device through the connection terminal, an operation of acquiring identification information from the external electronic device, an operation of, when the identification information meets a first predetermined condition, providing power regulated using the power regulator to the external electronic device through the connection terminal in a state in which the switch is open, and an operation of, when the identification information meets a second predetermined condition, providing power supplied from the battery to the external electronic device through the connection terminal in a state in which the switch is connected.

According to an embodiment, the identification information may include information related to authentication based on USB type-C or USB communication with the external electronic device.

According to an embodiment, the electronic device may further include an operation of transmitting the identification information to the external electronic device.

According to an embodiment, the electronic device may further include an operation of performing authentication of the external electronic device at least based on a comparison between the acquired identification information and the at least one piece of identification information stored in the memory and determining a condition which the identification information meets among the first predetermined condition and the second predetermined condition based on a result of the authentication.

According to an embodiment, when the acquired identification information is identical to the at least one piece of identification information stored in the memory within a predetermined range, the electronic device may include an operation of determining that authentication of the external electronic device is successful and determines that the identification information meets the second predetermined condition.

According to an embodiment, when identification information meets the second predetermined condition, the electronic device may include an operation of transmitting the current power of the battery to the external electronic device without passing through a circuit for boosting or reducing the voltage of the battery.

According to an embodiment, when it is determined that authentication is not successful, the electronic device may further include an operation of determining that the identification information meets the first predetermined condition.

According to an embodiment, when the identification information meets the first predetermined condition, the electronic device may further include an operation of regulating the power supplied from the battery to power within a predetermined range through the power regulator and providing the power within the predetermined range to the external electronic device through the connection terminal.

According to an embodiment, the switch may include at least one Metal Oxide Semiconductor Field Effect Transistor (MOSFET).

Figure 8A:
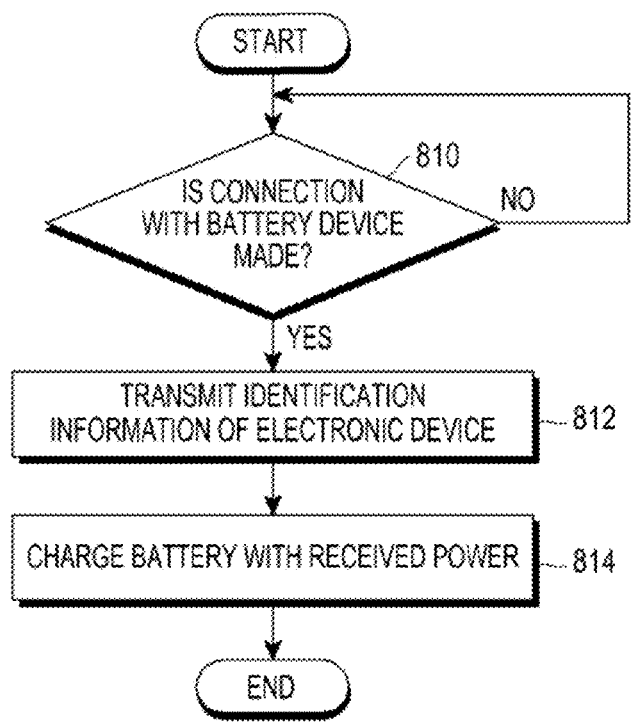
FIG. 8A is a flowchart illustrating an operation in which the electronic device receives power from the battery device according to various embodiments.

FIG. 8A is a flowchart illustrating an operation in which the electronic device receives power from the battery device according to various embodiments.

More specifically, FIG. 8A is a flowchart illustrating a process in which the electronic device 101 transmits identification information to the battery device 102 and receives power from the battery device 102 based on the transmitted identification information.

According to various embodiments, in operation 810, the electronic device 101 may detect a connection with the battery device 102. The electronic device 101 may be physically connected to the battery device 102. The electronic device 101 may be physically connected to the battery device 102 through a USB cable. The electronic device 101 may include a connector of USB type-C at the exterior thereof and may be physically connected to the battery device 102 through the USB cable. The electronic device 101 (for example, the processor 120) may detect the connection with the battery device 102 through the USB cable.

When the electronic device 101 is connected to the battery device 102 through the USB cable, the electronic device 101 (for example, the processor 120) may transmit information on the electronic device 101 to the battery device 102. The information may be transmitted through a particular pin of USB type-C. The information may be transmitted through a particular pin of USB type-C.

According to various embodiments, in operation 812, the electronic device 101 may transmit identification information of the electronic device. According to an embodiment, the electronic device 101 may transmit identification information of the electronic device 101 to the battery device 102. According to an embodiment, the electronic device 101 (for example, the processor 120) may transmit the identification information of the electronic device 101 to the battery device 102 through the USB cable. According to an embodiment, the electronic device 101 (for example, the processor 120) may transmit the identification information of the electronic device 101 to the battery device 102 via the connection terminal 178 through at least one terminal included in USB type-C or USB communication. When the battery device 102 is physically connected to the electronic device 101, the electronic device 102 may transmit at least one of an identifier of the electronic device 101, power information, information used for determining a role, and information used for determining a communication method to the battery device 102 through a CC terminal of USB type-C. The electronic device 101 (for example, the processor 120) may determine the role about whether to operate in a host mode or a device mode based on the information. According to an embodiment, when the electronic device 101 is connected to the battery device 102 through the USB cable, the electronic device 101 may operate in the host mode.

The identification information may include at least one of an identifier of the battery device 102, model information, and information indicating that the electronic device 101 can receive the current voltage of the battery 627 of the battery device 102 without passing through a circuit for boosting or reducing the voltage. According to an embodiment, the identification information may be transmitted while being included in a UVDM based on USB type-C. According to an embodiment, the electronic device 101 (for example, the processor 120) may transmit the identification information of the electronic device 101 to the battery device 102 through at least one terminal included in USB type-C or USB communication in order to receive power based on the current voltage of the battery 627 of the battery device 102. The terminal may include at least one of the CC terminal included in USB type-C, the data (D+ and D−) terminals, the transmission terminals (TX+ and TX−), the reception terminals (RX+ and RX−), and the power terminal (VBUS).

According to various embodiments, in operation 814, the electronic device 101 may charge the battery with the received power. According to an embodiment, the electronic device 101 (for example, the processor 120) may receive power based on the result of authentication performed by the battery device 102. The electronic device 101 may receive power regulated through the power regulator 630 in the state in which the switch of the switch unit 624 of the battery device 102 is open (for example, a first predetermined condition) or receive power supplied from the battery 627 of the battery device 102 in the state in which the switch of the switch unit 624 of the battery device 102 (for example, a second predetermined condition). According to an embodiment, when it is determined by the battery device 102 that the identification information received from the electronic device 101 meets the first predetermined condition, the electronic device 101 may receive power according to the voltage corresponding to the first predetermined condition. According to another embodiment, when it is determined by the battery device 102 that the identification information received from the electronic device 101 meets the second predetermined condition, the electronic device 101 may receive power according to the voltage corresponding to the second predetermined condition.

According to various embodiments, when the identification information meets the first predetermined condition (for example, when authentication is not successful), the electronic device 101 may receive power corresponding to the voltage generated by regulating the voltage of the battery 627 to a predefined voltage by the battery device 102. The electronic device 101 may receive power corresponding to the voltage generated by regulating the voltage of the battery 627 of the battery device 102 to a predefined voltage by the battery device 102. The predefined voltage may include 5 V, 9 V, 12 V, or 20 V regulated by the power regulator 630 of the battery device 102. According to an embodiment, when it is identified that authentication is not successful, the electronic device 101 may receive the voltage regulated by boosting or reducing the current voltage of the battery 627 of the battery device 102 to 5 V, 9 V, 12 V, or 20 V. According to another embodiment, when it is identified that authentication is not successful, the electronic device 101 may receive power corresponding to the voltage boosted or reduced to the voltage other than 5 V, 9 V, 12 V, or 20 V from the battery device 102. The electronic device 101 may charge the battery 189 of the electronic device 102 based on the voltage regulated by the power regulator 630 of the battery device 102.

Figure 8B:
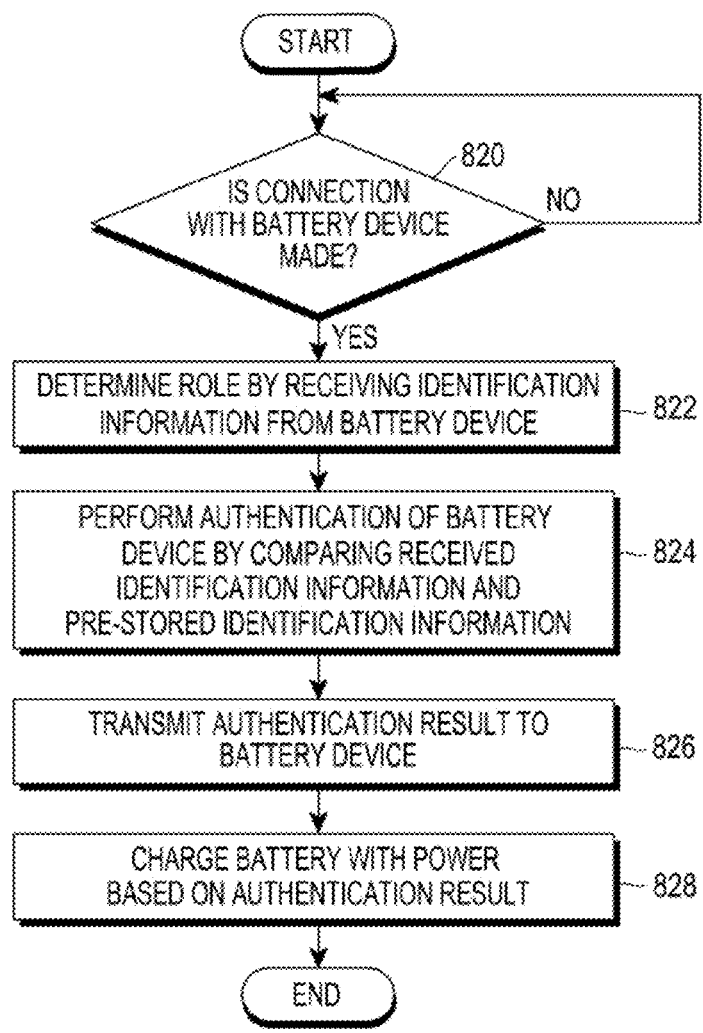
FIG. 8B is a flowchart illustrating an operation in which the electronic device receives power from the battery device according to various embodiments.
Figure 9A:
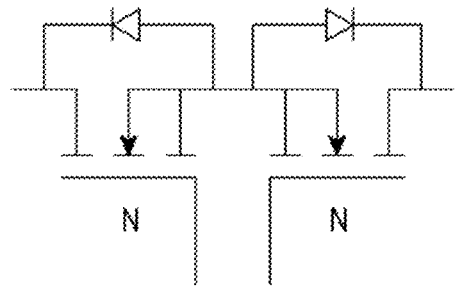
FIGS. 9A-9D illustrate a MOSFET included in a switch unit of the battery device according to various embodiments.
Figure 9B:
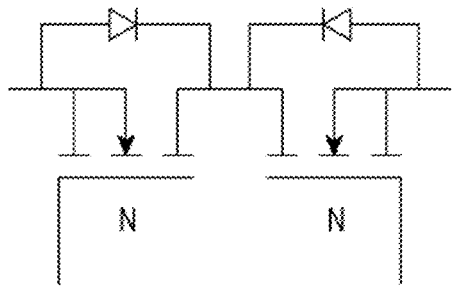
Figure 9C:
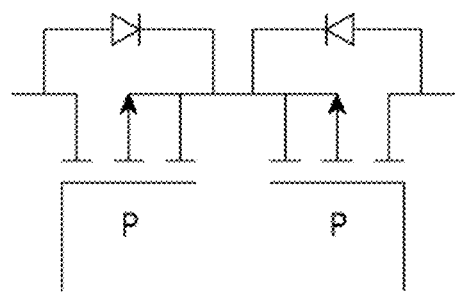
Figure 9D:
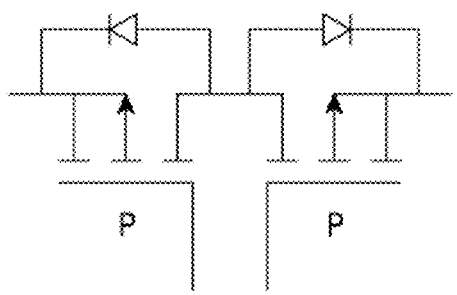

FIG. 8B is a flowchart illustrating an operation in which the electronic device receives power from the battery device according to various embodiments.

More specifically, FIG. 8B is a flowchart illustrating a process in which the electronic device 101 receives power from the battery device 102 after receiving identification information from the battery device 102 and performing authentication.

According to various embodiments, in operation 820, the electronic device 101 may detect a connection with the battery device 102. According to various embodiments, in operation 820, at least one operation, function, or characteristic performed in operation 810 of FIG. 8A may be performed.

According to various embodiments, in operation 822, the electronic device 101 may receive identification information from the battery device 102 and determine a role. According to an embodiment, the electronic device 101 (for example, the processor 120) may receive identification information of the battery device 102 through a USB cable. According to an embodiment, the electronic device 101 (for example, the processor 120) may receive the identification information of the battery device 102 through at least one terminal included in USB type-C or USB communication. According to an embodiment, when the electronic device 101 is connected to the battery device 102 through the USB cable, the electronic device 101 (for example, the processor 120) may receive information on the battery device 102. The information may be transmitted through a particular pin of USB type-C or USB communication. According to various embodiments, when the electronic device 101 is connected to the battery device 102 through the USB cable, the electronic device 101 (for example, the processor 120) may receive information on the battery device 102 from the battery device 102.

According to various embodiments, when the electronic device 101 is physically connected to the battery device 102, the electronic device 101 may make a request for information on the battery device 102 through the USB cable. The information may be transmitted through a particular pin of USB type-C or USB communication. When the battery device 102 is physically connected to the electronic device 101, the electronic device 101 may make a request for at least one of an identifier of the battery device 102, power information, information used for determining a role, and information used for determining a communication method through a Configuration Channel (CC) terminal of USB type-C or USB communication. In response to the request, the electronic device 101 may receive at least one of the identifier of the battery device 102, the power information, the information used for determining the role, and the information used for determining a communication method According to an embodiment, the electronic device 101 may determine the role in communication with the battery device 102 based on the received information. According to an embodiment, the electronic device 101 may determine the role based on the identification information received from the battery device 102. The electronic device 101 (for example, the processor 120) may determine the role about whether to operate in a host mode or a device mode based on the received information in response to the request. According to an embodiment, when the electronic device 101 is connected to the battery device 102 through the USB cable, the electronic device 101 may operate in the host mode.

According to an embodiment, the identification information may include at least one of an identifier of the battery device 102, model information, and information indicating that the battery device 102 can provide the current voltage of the battery 627 of the battery device 102 without passing through a circuit for boosting or reducing the voltage. According to an embodiment, the identification information may be received while being included in a UVDM based on USB type-C. According to an embodiment, in order to receive power based on the current voltage of the battery 627 of the battery device 102, the electronic device 101 may receive identification information of the battery device 102 through at least one terminal included in USB type-C. The terminal may include at least one of the CC terminal included in USB type-C, the data (D+ and D−) terminals, the transmission terminals (TX+ and TX−), the reception terminals (RX+ and RX−), and the power terminal (VBUS). According to an embodiment, the electronic device 101 (for example, the processor 120) may receive the identification information of the battery device 102 from the battery device 102 in order to receive the current voltage of the battery 627 of the battery device 102 without passing through the circuit for boosting or reducing the current voltage of the battery 627 of the battery device 102.

According to various embodiments, in operation 824, the electronic device 101 may perform authentication of the battery device 102 by comparing the received identification information and pre-stored identification information. According to an embodiment, the electronic device 101 (for example, the processor 120) may perform authentication of the battery device 102 at least based on the comparison between the identification information received from the battery device 102 and at least one piece of identification information pre-stored in the memory 130. The authentication may be performed for determining whether to receive the current voltage of the battery 627 of the battery device 102 without passing through the circuit for boosting or reducing the current voltage of the battery 627 of the battery device 102 (for example, including the voltage reduced according to power supply) or boost or reduce the current voltage of the battery 627 of the battery device 102 (for example, including the voltage reduced according to power supply) and then receive the boosted or reduced voltage. According to an embodiment, the authentication result may include information indicating whether the authentication is successful or fails.

According to various embodiments, in operation 826, the electronic device 101 may transmit the authentication result to the battery device. According to an embodiment, the electronic device 101 may perform authentication based on the identification information received from the battery device 102 and transmit the authentication result to the battery device 102. The authentication result may include information indicating that the electronic device 101 can receive the current voltage of the battery 627 of the battery device 102 without passing through the circuit for boosting or reducing the current voltage of the battery 627 of the battery device 102 (for example, including the voltage reduced according to power supply) or information indicating that the electronic device 101 can receive the voltage boosted or reduced from the current voltage of the battery 627 of the battery device 102 (for example, including the voltage reduced according to power supply).

According to various embodiments, in operation 828, the electronic device 101 may charge the battery with the received power based on the authentication result. According to an embodiment, the electronic device 101 (for example, the processor 120) may receive power from the battery device 102 based on the authentication result transmitted to the battery device 102. According to an embodiment, the electronic device 101 may receive power regulated through the power regulator 630 in the state in which the switch of the switch unit 624 of the battery device 102 is open (for example, a first predetermined condition) or receive power supplied from the battery 627 of the battery device 102 in the state in which the switch of the switch unit 624 of the battery device 102 is connected (for example, a second predetermined condition). According to an embodiment, when it is determined by the battery device 102 that the identification information received from the electronic device 101 meets the first predetermined condition, the electronic device 101 may receive power according to the voltage corresponding to the first predetermined condition and charge the battery 189. According to another embodiment, when it is determined by the battery device 102 that the identification information received from the electronic device 101 meets the second predetermined condition, the electronic device 101 may receive power according to the voltage corresponding to the second predetermined condition and charge the battery 189.

According to various embodiments, when the transmitted authentication result meets the first predetermined condition (for example, when authentication is not successful), the electronic device 101 may receive power corresponding to the voltage generated by regulating the voltage of the battery 627 to the predefined voltage by the battery device 102 and charge the battery 189. The electronic device 101 may receive power corresponding to the voltage generated by regulating the power of the battery 627 of the battery device 102 to the predefined voltage by the battery device 102 and charge the battery 189. The predefined voltage may include 5 V, 9 V, 12 V, or 20 V regulated by the power regulator 630 of the battery device 102. According to an embodiment, when it is determined that authentication is not successful, the electronic device 101 may receive the voltage regulated by boosting or reducing the current voltage of the battery 627 of the battery device 102 to 5 V, 9 V, 12 V, or 20 V. According to another embodiment, when it is identified that authentication is not successful, the electronic device 101 may receive power corresponding to the voltage boosted or reduced to the voltage other than 5 V, 9 V, 12 V, or 20 V from the battery device 102. The electronic device 101 may charge the battery 189 of the electronic device 102 based on the voltage regulated by the power regulator 630 of the battery device 102.

According to various embodiments, an electronic device including a connection terminal, a battery, a charging circuit, and a processor may include an operation of detecting a connection with an external electronic device through the connection terminal, an operation transmitting identification information to the external electronic device in order to allow the external electronic device to output one of first power which can be output from a battery of the external electronic device and second power regulated through a power regulator included in the external electronic device based on the first power, and an operation of charging the battery with the one power through the charging circuit.

According to an embodiment, the identification information may include information related to authentication based on USB type-C or USB communication with the external electronic device.

According to an embodiment, the electronic device may further include an operation of charging the battery with the first power supplied in a state in which a switch of the external electronic device is connected based on the transmitted identification information.

According to an embodiment, when it is identified that authentication is successful based on the transmitted identification information, the electronic device may be configured to receive the first power and charge the battery, and the first power may correspond to power actually identical to current power of the battery without passing through a circuit for boosting or reducing the voltage of the battery of the external electronic device.

According to an embodiment, when is identified that authentication is not successful based on the transmitted identification information, the electronic device may be configured to receive the second power and charge the battery, and the second power may be obtained by regulating power supplied from the battery to power within a predetermined range through the power regulator.

According to an embodiment, when identification information is received from the external electronic device, the electronic device may perform authentication of the external electronic device at least based on a comparison between the received identification information and the at least one piece of pre-stored identification information.

According to an embodiment, the identification information may be transmitted/received while being included in a Unstructured Vendor Defined Message (UVDM) transmitted/received through a Configuration Channel (CC) terminal of USB type-C.

According to various embodiments, an electronic device including a connection terminal for connecting to an external electronic device; a battery; a charging circuit; and a processor may include an operation of detecting the connection with the external electronic device through the connection terminal, an operation of acquiring identification information from the external electronic device, an operation of, when the identification information meets a first predetermined condition, charging the battery through the charging circuit using power output from the external electronic device, and an operation of, when the identification information meets a second predetermined condition, charging the battery through the charging circuit using one of first power which can be output from a battery of the external electronic device and second power regulated through a power regulator included in the external electronic device based on the first power.

According to an embodiment, the identification information may include information related to authentication based on USB type-C or USB communication with the external electronic device.

According to an embodiment, the electronic device may further include an operation of performing authentication of the external electronic device at least based on a comparison between the acquired identification information and the at least one piece of identification information stored in the memory.

According to an embodiment, when the identification information meets the second predetermined condition, the electronic device may further include an operation of receiving the first power and charging the battery, and the first power may correspond to power actually identical to current power of the battery without passing through a circuit for boosting or reducing a voltage of the battery of the external electronic device.

According to an embodiment, when the identification information meets the second predetermined condition, the electronic device may further include an operation of receiving the second power and charging the battery, and the second power may be power obtained by boosting or reducing a current voltage of the battery of the external electronic device to a predetermined voltage.

FIGS. 9A to 9D illustrate a MOSFET included in the switch unit 624 of the battery device 102 according to various embodiments.

FIGS. 9A to 9D illustrate various configuration examples of the MOSFET and each MOSFET may operate as a switch. In the MOSFET in FIGS. 9A to 9D may be referred to as a back-to-back MOSFET. Referring to FIGS. 9A to 9D, the switch unit 624 of the battery device 102 may include an On/Off switch or at least one MOSFET. A FET is a device for flowing an electron (−) or an electron hole (+) by an electric field generated through the application of a voltage to a gate (G), and the MOSFET includes a metal, an oxide film, and a semiconductor area, has three terminals such as a source, a gate, and a drain, and classified as an NMOS type when the electron (−) moves and a PMOS type when the electron hole (+) moves. The MOSFET may bypass power of the battery 627 of the battery device 102 by controlling a current between the drain and the source by the voltage of the gate.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a connection terminal;
a battery;
a power regulator configured to generate a second power by regulating a first power supplied from the battery;
a switch; and
a control circuit,
wherein the control circuit is configured to:
detect a connection with an external electronic device through the connection terminal,
after detecting the connection with the external electronic device, perform, based on identification information of the external electronic device, an authentication with the external electronic device,
based on the authentication being successful, control the switch to be in a first state in which the first power supplied from the battery is bypassed to the connection terminal such that the first power is provided to the external electronic device, and
based on the authentication not being successful, control the switch to be in a second state in which the first power supplied from the battery is provided to the power regulator such that the second power that is based on the first power, generated by the power regulator is provided to the external electronic device through the connection terminal.

2. The electronic device of claim 1, wherein the identification information includes information related to the authentication based on USB type-C or USB communication with the external electronic device.

3. The electronic device of claim 1, wherein the control circuit is configured to transmit identification information of the electronic device to the external electronic device.

4. The electronic device of claim 1, further comprising a memory configured to store at least one piece of identification information, wherein the control circuit is configured to:
acquire the identification information, and
perform the authentication with the external electronic device, based on a comparison between the acquired identification information and the at least one piece of identification information stored in the memory.

5. The electronic device of claim 4, wherein, when the acquired identification information is identical to the at least one piece of identification information stored in the memory within a predetermined range, the control circuit is configured to determine that the authentication of the external electronic device is successful.

6. The electronic device of claim 4, wherein, when the acquired identification information is different from the at least one piece of identification information stored in the memory, the control circuit is configured to determine that the authentication of the external electronic device is not successful.

7. The electronic device of claim 6, wherein, based on the authentication not being successful, the control circuit is further configured to control the power regulator to regulate the first power supplied from the battery to the second power within a predetermined range and provide the second power within the predetermined range to the external electronic device through the connection terminal.

8. The electronic device of claim 1, wherein the switch includes at least one Metal Oxide Semiconductor Field Effect Transistor (MOSFET) or an On/Off switch.

9. An electronic device comprising:
a connection terminal;
a battery;
a charging circuit; and
a processor,
wherein the processor is configured to:
detect a connection with an external electronic device through the connection terminal,
after detecting the connection with the external electronic device, perform, based on identification information of the external electronic device, an authentication with the external electronic device,
based on the authentication being successful, transmit first information for causing the external electronic device to control a switch of the external electronic device to be in a first state in which a first power supplied from a battery of the external electronic device is bypassed to a connection terminal of the external electronic device such that the first power is provided from the external electronic device to the electronic device,
based on the authentication not being successful, transmit second information for causing the external electronic device to control the switch to be in a second state in which the first power supplied from the battery of the external electronic device is provided to a power regulator of the external electronic device such that a second power that is, based on the first power, generated by the power regulator is provided from the external electronic device to the electronic device, and
charge the battery of the electronic device with the first or second power through the charging circuit.

10. The electronic device of claim 9, wherein the identification information includes information related to the authentication based on USB type-C or USB communication with the external electronic device.

11. The electronic device of claim 9, wherein the first power corresponds to power actually identical to current power of the battery of the electronic device.

12. The electronic device of claim 9, further comprising a memory configured to store at least one piece of identification information, wherein, when the identification information is received from the external electronic device, the processor is configured to perform the authentication of the external electronic device at least based on a comparison between the received identification information and the at least one piece of identification information stored in the memory.

13. The electronic device of claim 9, wherein the identification information is transmitted/received while being included in a Unstructured Vendor Defined Message (UVDM) transmitted/received through a Configuration Channel (CC) terminal of USB type-C.

14. A method for providing an external electronic device with power in an electronic device, the method comprising:
　detecting a connection with the external electronic device;
　after detecting the connection with the external electronic device, performing, based on identification information of the external electronic device, an authentication with the external electronic device;
　based on the authentication being successful, controlling a switch of the electronic device to be in a first state in which a first power supplied from a battery of the electronic device is bypassed to a connection terminal of the electronic device such that the first power is provided to the external electronic device; and
　based on the authentication not being successful, controlling the switch to be in a second state in which the first power supplied from the battery is provided to a power regulator of the electronic device such that a second power which is, based on the first power, generated by the power regulator is provided to the external electronic device through the connection terminal.

15. The method of claim 14, wherein the identification information includes information related to the authentication based on USB type-C or USB communication with the external electronic device.

16. The method of claim 14, further comprising:
　transmitting identification information of the electronic device to the external electronic device.

17. The method of claim 14, further comprising acquiring the identification information,
　wherein performing the authentication with the external electronic device comprises:
　performing the authentication with the external electronic device, based on a comparison between the acquired identification information and at least one piece of identification information stored in a memory of the electronic device.

18. The method of claim 17, further comprising:
　when the acquired identification information is identical to the at least one piece of identification information stored in the memory within a predetermined range, determining that the authentication of the external electronic device is successful.

19. The method of claim 17, further comprising:
　when the acquired identification information is different from the at least one piece of identification information stored in the memory, determining that the authentication of the external electronic device is not successful.

20. The method of claim 19, further comprising:
　based on the authentication being not successful, controlling the power regulator to regulate the first power supplied from the battery to the second power within a predetermined range and provide the second power within the predetermined range to the external electronic device.

21. The method of claim 14, wherein the switch includes at least one Metal Oxide Semiconductor Field Effect Transistor (MOSFET) or an On/Off switch.

* * * * *